INVENTOR
M. E. KROM
BY
Harold C. Herman
ATTORNEY

INVENTOR
M. E. KROM
BY Harold C. Herman
ATTORNEY

INVENTOR
M. E. KROM
BY Harold C. Herman
ATTORNEY

INVENTOR
M.E. KROM
BY Harold C. Herman
ATTORNEY

Jan. 12, 1960 M. E. KROM 2,921,139

LINE CONCENTRATOR SIGNALING SYSTEM

Filed Dec. 31, 1957 13 Sheets-Sheet 5

INVENTOR
M. E. KROM
BY
Harold C. Herman
ATTORNEY

INVENTOR
M. E. KROM
BY Harold C. Herman
ATTORNEY

INVENTOR
M. E. KROM
BY Harold C. Herman
ATTORNEY

INVENTOR
M. E. KROM
BY
Harold C. Herman
ATTORNEY

INVENTOR
M. E. KROM
BY Harold C. Herman
ATTORNEY

INVENTOR
M. E. KROM
BY Harold C. Herman
ATTORNEY

Jan. 12, 1960 M. E. KROM 2,921,139

LINE CONCENTRATOR SIGNALING SYSTEM

Filed Dec. 31, 1957 13 Sheets-Sheet 11

INVENTOR
M. E. KROM
BY
Harold C. Hersman
ATTORNEY

Jan. 12, 1960 M. E. KROM 2,921,139

LINE CONCENTRATOR SIGNALING SYSTEM

Filed Dec. 31, 1957 13 Sheets-Sheet 12

INVENTOR
M. E. KROM
BY Herold C. Herman
ATTORNEY

Jan. 12, 1960 M. E. KROM 2,921,139

LINE CONCENTRATOR SIGNALING SYSTEM

Filed Dec. 31, 1957 13 Sheets-Sheet 13

| CONNECT LEAD | TO THE T-LEAD ASSOCIATED WITH VG-RELAYS | | | | | | | | | |
|---|---|---|---|---|---|---|---|---|---|---|
| | VG0 | VG1 | VG2 | VG3 | VG4 | VG5 | VG6 | VG7 | VG8 | VG9 |
| C0 | T3 | T2 | | T0 | T1 | | | T2 | | |
| C1 | T2 | T3 | | T1 | T3 | | | T0 | | |
| C2 | T1 | | T0 | T2 | | | | | T0 | T3 |
| C3 | T0 | | T1 | T3 | | | | | T2 | T1 |
| C4 | | | T2 | | T0 | T1 | T2 | T3 | | |
| C5 | | | T3 | | T2 | T3 | T0 | T1 | | |
| C6 | | T0 | | | | T0 | T3 | | T1 | T2 |
| C7 | | T1 | | | | T2 | T1 | | T3 | T0 |

INVENTOR
M. E. KROM
BY
Harold C. Herman
ATTORNEY 2,921,139

LINE CONCENTRATOR SIGNALING SYSTEM

Myron E. Krom, Convent Station, N.J., assignor to Bell Telephone Laboratories, Incorporated, New York, N.Y., a corporation of New York Application December 31, 1957, Serial No. 706,370

20 Claims. (Cl. 179—18)

This invention relates to line concentrator telephone systems and more particularly to signaling arrangements utilized in line concentrator systems.

In conventional telephone systems each subscriber station requires a pair of wires to connect it with the central office. For a substation which is located at a considerable distance from the central office the cost of these wires is substantial. In fact, in the present day telephone plant a large portion of the cost of installation and operation is that of the wire used in the subscriber loops between the substations and the central office. A line concentrator system is a means for reducing the outside plant serving the central office by effectively moving a portion of the switching equipment to which the lines are connected to a location remote from the central office. The remotely located equipment is a slave unit controlled by the central office to concentrate the traffic from the subscriber lines to the central office. A system of this type is disclosed in the Patent 2,812,385 granted on November 5, 1957 to Joel-Krom-Posin.

As the central office is not directly in information communication with the subscriber lines due to the interposition of the remote line concentrator, it is generally necessary to provide a number of control leads to effect test and control functions. In order to obtain the greatest saving, it is desirable to have a high ratio between the subscriber lines extending from the concentrator and the trunk extending from the central office while keeping the number of control leads to a minimum.

It is a general object of this invention to provide an improved signaling arrangement for transferring information over the control leads between the remote line concentrators and the central office.

In an illustrative embodiment of the present invention a line scanner of the type disclosed in the copending patent application Serial No. 706,474, filed by G. F. Abbott, Jr. on even date herewith is driven by pulses supplied through the control leads to the line concentrator to cyclically determine the service conditions of the lines. The line scanner is normally connected to each of the lines.

Another object of this invention is to provide a clear, unbridged connection from the lines through the trunks to the central office. When a connection is established between a line and a trunk, the line scanner is disconnected from the line and when the established connection is released the line scanner is reconnected. In this manner, a clear unbridged connection is provided when a connection is established.

A feature of this invention relates to means for maintaining both the connection of the line scanner to an idle line and its disconnection from a busy line without utilizing operating current. Magnetically latched relays of the type disclosed in the copending patent application Serial No. 697,465 which was filed on November 19, 1957 by G. E. Perreault are utilized to connect and disconnect the line scanner. Latched relays are also utilized to connect the lines to the trunks so that the talking connections remain established in the absence of operating current for maintaining the connections.

Another feature of this invention pertains to means for utilizing the line scanner for outpulsing information from the central office during connect and disconnect sequences as well as for normal scanning. As in ordinary crossbar telephone systems, the subscriber lines are arbitrarily arranged in groups designated vertical groups and vertical files. Each of the lines is identified by a vertical group number and a vertical file number. Vertical group identifying pulses and vertical file identifying pulses are supplied over the control leads to the line concentrator during normal scanning and also when a connection is to be established or disconnected.

Still another feature of this invention relates to means for utilizing the vertical file and vertical group pulses for logical functions as well as for line identification. The dual function of these pulses permits restricting the number of control leads while outpulsing trunk information as well as line information through the leads to the concentrator. The trunk utilized for a connection is selected at the central office and its identity must be provided to the concentrator. After a clear tip and ring connection is provided, disconnect signals cannot be provided over the busy talking trunk because nothing is connected to it, so that the control leads are utilized. By utilizing the vertical group and vertical file scanning pulses for outpulsing the line information and for other control functions as well, the required number of control leads is maintained at a minimum.

Still another feature of this invention pertains to concurrently outpulsing the identity of a trunk and the vertical group identity of a line over separate control leads. The vertical file identity of the line is thereafter outpulsed.

A further feature of this invention relates to utilizing the first vertical file pulse as an indication that trunk outpulsing is complete. Pulses of the same polarity as the trunk pulses and over the same control lead are thereafter received and utilized at the concentrator as mark pulses to operate the latched relays for connecting the line to the trunk. In other words, the trunk and mark pulses, which are identical, are separated at the concentrator under control of the vertical file pulses.

Still a further feature of this invention relates to means for utilizing the vertical group pulses to indicate disconnect. During a disconnect sequence the maximum number of vertical group identifying pulses plus one is outpulsed to the concentrator. The last pulse indicates that the outpulsing sequence is for disconnect.

In this manner, all three identifying pulses, vertical group, vertical file and trunk, have dual outpulsing functions. The vertical group pulses indicate disconnect; the vertical file pulses indicate that trunk outpulsing is complete; and the trunk pulses are also utilized as mark pulses.

Further objects, features and advantages of the present invention will become apparent upon consideration of the following description in conjunction with the drawing wherein:

Figs. 2 through 12 are a circuit representation of the line concentrator system of the present invention wherein:

Figs. 2 through 4 illustrate a remotely located line concentrator;

Fig. 5 illustrates functionally another concentrator and a concentrator control circuit, a register circuit and a pulse generator at the central office;

Figs. 6 and 8 illustrate a concentrator control circuit at the central office;

Fig. 7 illustrates functionally a memory circuit and a selector circuit at the central office;

Figs. 9 and 11 illustrate an outpulsing control circuit at the central office;

Fig. 10 illustrates functionally a trunk switch and a number of common control circuits at the central office; and Fig. 12 illustrates a frame control circuit at the central office;

*General description*

Figure 1:
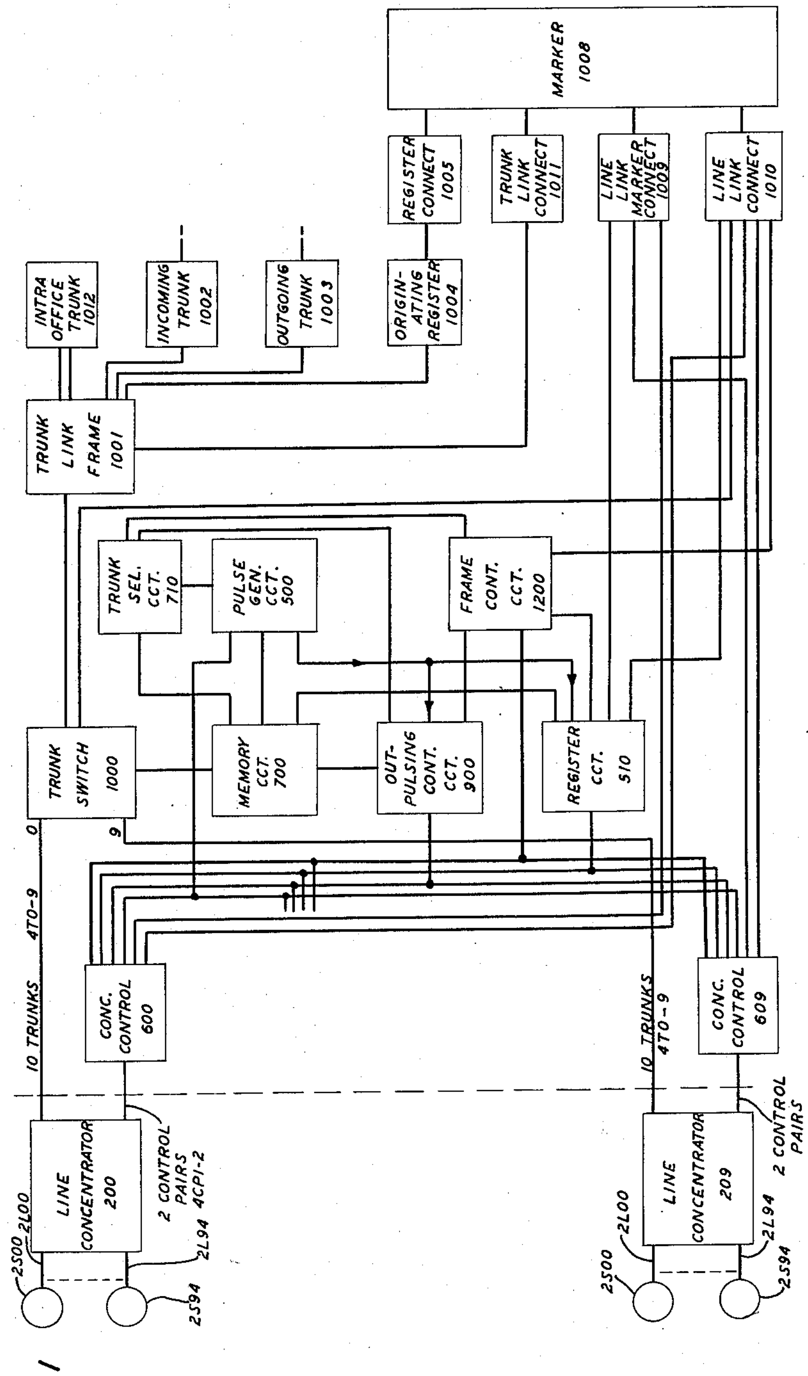
Fig. 1 is a functional diagram of the line concentrator system of the present invention.

Referring to Fig. 1, which is a functional representation of the line concentrator system, the first digit or digits of the reference numbers indicates one of the figures in the detail circuit drawing in which the circuit appears. For example, the line concentrator 200 appears partially in Fig. 2.

The line concentrator 200 and nine other line concentrators 201–9 provide for connections from groups of fifty subscriber stations 2S00, etc. to groups of ten talking trunks 4T0–9. Of the fifty subscriber stations 2L00, etc. connected to each of the line concentrators 200–9, only the substations 2S00 and 2S94 are shown. The designations of the substations identify the vertical group and a vertical file of the substation. These terms, which are hereinafter described, identify the time position of the substations in a scanning cycle. The last digit of each designation indicates the vertical file identity and the next-to-last digit indicates the vertical group identity. For example, the substation 2S94 has a vertical group of 9 and a vertical file of 4.

The effect of utilizing the line concentrators 200–9 is to place a part of the switching equipment of the central office at a distance therefrom. Each of the line concentrators 200–9 is connected to the central office by one of the groups of ten trunks 4T0–9 and by two control pairs 4CP1—2. The trunks 4T0–9 provide talking paths between the line concentrators 200–9 and the central office, and the two control pairs 4CP1—2 provide for signaling paths to and from the central office equipment. With fifty subscriber stations connected to each of the ten concentrators 200–9 there are a total of 500 stations which are served by the central office equipment shown in Figs. 5 through 12. The stations 2S00, etc. are connected respectively by the lines 2L00, etc. to their associated concentrators 200–9.

With all 500 subscriber lines idle the central office continuously and synchronously scans the ten groups of fifty subscriber lines connected respectively to the ten concentrators 200–9 in order to detect service requests. The ten line concentrators 200–9 are synchronously scanned under control of a pulse generator 500 which simultaneously provides scanning pulses in parallel through ten concentrator control circuits 600–9 and the ten sets of control pairs 4CP1—2 to the ten line concentrators 200–9. The pulse generator 500 also supplies the scanning pulses to a register circuit 510 which is synchronously operated with the line concentrators 200–9. The concentrator control circuits 600–9 are individually associated with the concentrators 200–9, and the pulse generator 500 and the register 510 are common control equipment for all ten concentrators 200–9.

The pulse generator 500 supplies four types of pulses: vertical group pulses; vertical file pulses; reset pulses; and two types of timing pulses. These four types of pulses are illustrated in the pulse sequence diagram shown in Fig. 14. As in ordinary crossbar telephone systems the subscriber lines are arbitrarily arranged in groups designated vertical groups, vertical files and horizontal groups. All the subscriber lines connected to one of the ten concentrators 200–9 are in the same horizontal group and each horizontal group is subdivided into ten vertical groups each of which includes five vertical files. The vertical group pulses supplied by the generator 500 select a group of five lines connected to each of the concentrators 200–9. The vertical group pulse is supplied simultaneously to the ten line concentrators 200–9 so that five times ten or fifty subscriber lines are simultaneously selected. Between two such vertical group pulses the pulse generator 500 supplies five vertical file pulses to select one subscriber line connected to each of the ten concentrators 200–9. In order to scan the 500 lines the pulse generator 500 provides to each of the ten concentrators 200–9 and to the register 510, ten vertical group pulses spaced at intervals of 24 milliseconds and between each pair of vertical group pulses five vertical file pulses spaced at intervals of 4 milliseconds. The complete scanning cycle has a duration of 240 milliseconds.

In addition to the vertical group pulses and the vertical file pulses the generator 500 supplies one reset pulse at the beginning of each cycle to insure the synchronous operation of the line concentrators 200–9 and the register 510 with the generator 500. Each reset pulse also functions as the first vertical group pulse so that only nine vertical group pulses are provided instead of ten during each scanning cycle.

During each scanning cycle, therefore, the generator 500 supplies one reset pulse, nine vertical group pulses and fifty vertical file pulses. The generator 500 also supplies timing pulses at a rate of 500 and 250 pulses per second which are utilized when a call to or from one of the 500 subscriber lines is served. The line scanning sequence is at a relatively low frequency of 250 pulses per second because of the propagation time of the signals through the control pairs 4CP1—2. The sequences of pulses are such that a vertical file pulse must be sent from the central office and a service request derived from that vertical file pulse must be received back at the central office before the succeeding vertical file pulse is transmitted. It is this limitation which establishes a maximum of 250 pulses per second for the scanning frequency. This limitation, however, does not exist during an outpulsing sequence for supplying line and trunk identities to the concentrators 200–9 so that a speed of 500 pulses per second may be utilized. A higher outpulsing speed is desirable to prevent increasing the holding time of common control equipment hereinafter described.

All the pulses or signals supplied over the control pairs 4CP1—2 in either direction are dipulses. A dipulse is a composite signal having a pulse of one polarity immediately followed by a pulse of the opposite polarity. The circuits 600–9 function to convert the positive scanning pulses from the generator 500 to dipulses. The concentrators 200–9 determine the identity of each composite pulse by blanking its second half. In a similar manner, the service request indication to the central office is a dipulse as its latter half is inhibited at the circuits 600–9. Dipulses are utilized to maintain the control pairs 4CP1—2 in a discharged condition as chains of pulses of one polarity tend to charge the control pairs 4CP1—2 to vary detection levels and distort waveforms.

In all, there are only four types of pulses sent from the central office and two types sent from the line concentrators 200–9. The vertical file pulses and mark pulses, which are utilized during outpulsing, are transmitted over the control pair 4CP2 from the central office, the vertical group and reset pulses are transmitted over the control pair 4CP1 from the central office, and the service request pulse and a check pulse, which is also utilized during outpulsing, are transmitted over the control pair 4CP1 to the central office. The control pair 4CP1 is, in this manner, a bilateral transmission channel. Each pair of pulses, such as the vertical file and mark pulses, are essentially pulses of opposite polarity which are transmitted in the same direction over the same control pair.

Each of the pulses from the central office is utilized for a number of functions in order to keep the number of control pairs 4CP1—2 to a minimum. These functions, some of which are described above, are tabulated below:

(*a*) The vertical file pulses—

(1) Identify the vertical file of each line during scanning;

(2) Are transformed to service request pulses to initiate originating calls;

(3) Identify the vertical file of the line to be connected during outpulsing; and (4) Indicate that trunk outpulsing is completed during outpulsing and that pulses which follow over the control pair 4CP2 are to be utilized as mark pulses instead of trunk pulses.

(*b*) The vertical group pulses—

(1) Identify the vertical group of each line during scanning;

(2) Identify the vertical group of each line to be connected during outpulsing; and (3) Indicate that a sequence is for disconnect at the concentrators 200–9.

(*c*) The mark pulses—

(1) Identify the selected trunk during connect and disconnect outpulsing; and (2) Function to establish and disconnect connections under control of the vertical file pulses during connect and under control of the vertical group pulses during disconnect.

(*d*) The reset pulses—

(1) Function as the first vertical group pulse during scanning;

(2) Function as a synchronizing pulse during scanning;

(3) Function as a normalizing pulse before each connect and disconnect operation; and (4) Function as a synchronizing pulse after each connect and disconnect sequence.

In this manner each of the four pulses performs a number of functions. By so doing only two control pairs are required.

At the line concentrators 200–9 the scanning pulses function to cyclically determine the service conditions of the fifty lines 2L00, etc. connected thereto. If all ten sets of fifty lines 2L00, etc. remain idle, the scanning sequence continues uninterrupted under control of the vertical group, vertical file and reset pulses from the central office. In each of the line concentrators 200–9 each vertical group pulse prepares for scanning five lines and each vertical file pulse scans one of the five lines in the group. The lines are successively scanned by the vertical file pulses so that service requests initiated at the line concentrators 200–9 can be identified at the register 510 on a time basis.

When a service request is initiated at any one of the ten sets of fifty lines 2L00, etc. the vertical file pulse identifying it is transformed by the associated one of the line concentrators 200–9 to a service request pulse which is sent back through the control pairs 4CP1—2 to the central office. Assume, for example, that a service request is initiated at the line 2L00 of the line concentrator 200. The service request pulse is supplied through the control pair 4CP1 to the concentrator control circuit 600 in the central office. The control circuit 600 functions to register the identity of the concentrator from which the service request is initiated and to initiate a sequence of operations for establishing a connection from the service requesting line 2L00 through one of the trunks 4T0–9, a trunk switch 1000 and a trunk link frame 1001 to an originating register 1004 which supplies dial tone. More specifically, the concentrator control circuit 600 halts the register circuit 510 at the identity of the calling line 2L00, it blocks the vertical group and reset pulsing to the line concentrator 200 and it supplies an inhibiting potential to the circuits 601–9 which block the vertical group and reset pulsing to the line concentrators 201–9. The circuit 600 also supplies the identity of the service requesting concentrator 200, which is the horizontal group identity, to a frame control circuit 1200. The frame control circuit 1200 functions as a buffer between the common control equipment such as connectors 1010 and 1009 and a marker 1008, which are disclosed in a Patent 2,585,904 granted to A. J. Busch on February 19, 1952, and the central office common control equipment associated with the line concentrators 200–9. When the frame control circuit receives the horizontal group identity and also the vertical group identity of the service requesting line 2L00, it functions to seize the marker 1008 for the originating call.

When the register 510 is stopped, it registers an indication of the vertical file and the vertical group of the service requesting line 2L00 and supplies the line identity to the frame control circuit 1200. The frame control circuit 1200 seizes a line link marker connector 1009 and supplies to it a seizure indication indicating a request for the connection of the marker 1008. Responsive thereto, the marker 1008 is seized by the connector 1009 and in turn seizes the line link connector 1010.

When the marker 1008 is seized, it seizes the dial-tone register 1004 in preparation for connecting it to the calling line 2L00 and it seizes the line link connector 1010 receiving the vertical group and horizontal group information therefrom. The vertical file information is thereafter received from the connector 1009. With the vertical group, vertical file and horizontal group information relating to the calling line 2L00 received at the marker 1008, the line link connector 1010 is controlled by the marker 1008 to supply this information to the frame control circuit 1200. In addition, an indication that the call is a dial tone or originating call is supplied to the frame control circuit 1200.

The line information is supplied back to the circuit 1200 in this manner to provide for a sequence that may be utilized for originating as well as terminating calls. As is hereinafter described, a terminating call is handled in substantially the same manner as an originating call from the time the frame control circuit 1200 receives the line information from the marker 1008.

When the frame control circuit 1200 receives the line information from the marker 1008, it functions to initiate a trunk selection sequence in a trunk selector 710, and to ready the central office for outpulsing the identity of the selected trunk and the identity of the calling line 2L00 to the line concentrator 200. In readying the central office, the circuit 1200 supplies the line information to an outpulsing control circuit 900 which, as is hereinafter described, outpulses it to the concentrator 200. The line information is also supplied by the circuit 1200 to a memory circuit 700 which maintains a running record of the connections established through the line concentrators 200–9. When the information is received at the memory circuit 700, an idle test is made of the calling line 2L00. For originating calls this check or test is unnecessary. However, the same test is made for terminating calls, callback calls and no-test calls where it is necessary. The same outpulsing sequence is utilized for the terminating and originating calls so that the test is made on the originating call as well as on terminating calls. An idle line indication is provided to the outpulsing control circuit 900.

The trunk selection sequence is initiated in the selector circuit 710 when a start potential is provided thereto from the frame control circuit 1200. In addition to the start potential from the frame control circuit 1200, the selector circuit 710 utilizes a timing pulse from the pulse generator 500 and trunk availability information from the memory circuit 700. Only six of the trunks 4T0–9 are available for connection to any one of the lines 2L00, etc. and a selection preference is established wherein trunks 4T8–9 are always the last two preferred trunks. The six trunks connectable to a line are referred to as a trunk multiple and the multiples are the same for all five lines in each vertical group. In all, there are ten different trunk multiples, one for each vertical group.

Figures 14, 15:
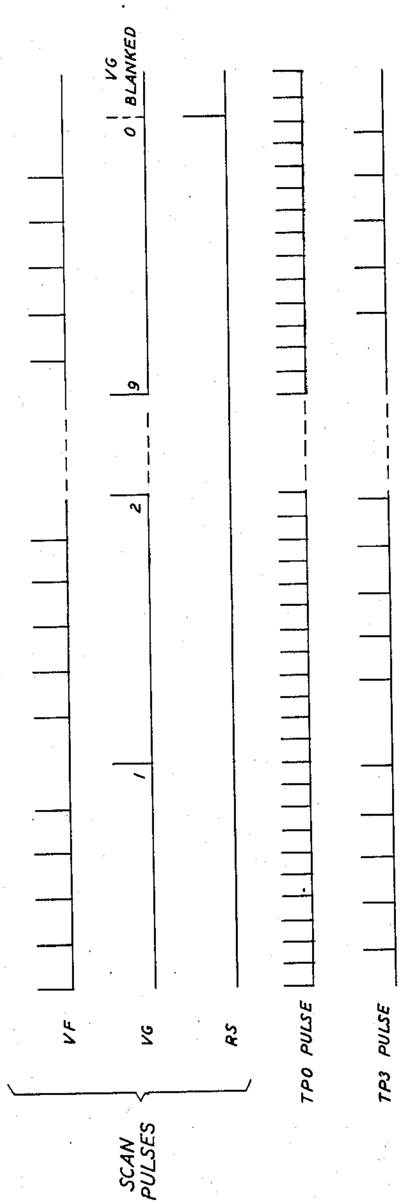
Fig. 14 is a series of curves illustrating the scanning and outpulsing signals utilized in the signaling system.
Fig. 15 is a table illustrating the trunk grouping and preference.

The trunk availability information is provided to the circuit 710 from the memory circuit 700 which stores a record of each established call or connection through the line concentrators 200–9. Fig. 15 illustrates the order in which the trunks are tested for each vertical group. The leads C0–7 identify the trunk number and the leads T0–3 identify the order of testing for preference. For example, the trunks 4T0–3, 4T8–9 are connectable to any of the lines 2L00–4 in the vertical group 0, with the order of preference being 4T3, 4T2, 4T1, 4T0, 4T8 and 4T9. A ground potential is provided for one of the trunks 4T0–9 to the selector circuit 710 when an idle indication is provided both from the memory circuit 710 and from the trunk switch 1000. Both circuits must provide an idle indication for a trunk availability ground to be provided to the circuit 710. Only available trunks provide for a ground potential to the circuit 710 as trunks that are busy as well as trunks that are not in the trunk multiple provide for an open circuit to the selector circuit 710.

Suppose, for example, that trunks 4T3–1 of the concentrator 200 are busy but that trunk 4T0 is idle so that a ground potential is provided for the fourth preferred trunk. With the first three preferred trunks 4T3–1 for the vertical group 0 unavailable, the fourth preferred trunk 4T0, which is idle, is selected and identified by the selector circuit 710. The selected trunk identity is supplied by the circuit 710 to the trunk switch 1000 and to the memory circuit 700. The switch 1000 functions to connect the trunk 4T0 through the trunk line frame 1001 to the originating register 1004 and the memory circuit 700 functions to register the line and selected trunk identities. As described above, the line information is supplied to the memory circuit 700 from the circuit 1200 when it is seized by the marker 1008. As is hereinafter described, the switch 1000 does not complete the connection until a memory check indication of the registration of the line and trunk information is provided thereto. When the selector circuit 710 selects the trunk 4T0, it also provides an indication that a trunk is selected through the frame control circuit 1200 and the connector 1010 to the marker 1008.

If all the trunks in the multiple are busy, the call is abandoned. The marker 1008 does not complete the connection to the originating register 1004 until the indication is provided through the connector 1010 that the selector circuit 710 has selected a trunk. If a trunk is not selected an overflow indication is provided from the selector circuit 710 to the frame control circuit 1200 which initiates a reset operation for returning the central office and the line concentrators 200–9 to normal.

When the concentrator control circuit 600 is operated by the circuit 1200, it readies outpulsing paths from the control circuit 900 to the control pairs 4CP1—2 and it provides a start potential to the circuit 900. Before initiating a trunk outpulsing sequence, the circuit 900 supplies a reset pulse to the line concentrators 200–9 to ready them for the reception of the outpulsed information.

With the reset pulse provided to the concentrator 200, and with an idle test indication received from the memory circuit 700, the circuit 900 supplies to the selector circuit 710 timing pulses from the pulse generator 500. The timing pulses are utilized at the selector circuit 710 to supply an indication of the selected trunk identity through the circuit 900, the circuit 600 and the control pairs 4CP1—2 to the line concentrator 200. Trunk outpulsing over the control pairs 4CP1—2 is utilized instead of providing signals over the trunks 4T0–9 because a clear tip and ring is provided from the line 2L00. With a clear tip and ring through the concentrator 200, disconnect signals cannot be supplied over the selected trunk 4T0 after the call is terminated. Since it is advisable to have similar connect and disconnect outpulsing sequences, trunk pulsing is utilized over the control pairs 4CP1—2.

At the same time that the trunk identity is being supplied to the concentrator 200, the circuit 900 outpulses the vertical group identity of the calling line 2L00. As described above, the line information was supplied to the circuit 900 from the frame control circuit 1200. The vertical group outpulsing is concurrent with the trunk outpulsing as both utilize the same timing pulses from the pulse generator 500. To identify the selected trunk 4T0, one pulse is provided to the concentrator 200. If the selected trunk was trunk 4T1, two pulses would be provided to the concentrator 200, etc. For the vertical group 0 no pulses are provided to the concentrator 200 because it is set to identify the vertical group 0 when it is reset or normalized by the outpulsing control circuit 900. If the vertical group was 1, one pulse would be provided, etc.

When both the trunk and vertical group outpulsing is completed the outpulsing control circuit 900 supplies the vertical file identity to the line concentrator 200. For the vertical file identity 0, five vertical file pulses are provided to the line concentrator 200. If the vertical file identity was 1, a single pulse would be provided; for a vertical file identity of 2, two pulses would be provided, etc. Five pulses are sent for vertical file 0 because at least one is required as the first vertical file pulse performs a dual function. In addition to being part of the vertical file signal, it also sets the line concentrator 200 for the reception of mark pulses. The control pair 4CP2 is utilized for both trunk and mark pulses which are both of the same polarity. The first vertical file pulse indicates to the concentrator 200 that trunk outpulsing is completed and that subsequent pulses of the same polarity as the trunk pulses through the control pair 4CP2 are mark pulses. With the selected trunk and line identities outpulsed to the concentrator 200, it is ready for crosspoint closure by the central office mark pulses.

During the outpulsing sequence, as described above, the memory circuit 700 is operated to register the outpulsed line and trunk identities. When the memory circuit 700 registers the line and trunk identities, it provides a memory check indication to the outpulsing control circuit 900 which is enabled to supply the mark pulses to close the connection at the concentrator 200 between the line 2L00 and the selected trunk 4T0. The mark pulses are supplied through the circuit 600 and the control pair 4CP2 to operate the concentrator 200.

When the connection is established at the line concentrator 200 to the calling line 2L00, the scanning circuitry shown in the detail circuit drawings is dissociated from the line 2L00 so that a clear tip and ring connection is provided to the central office. At the same time a crosspoint closure indication is supplied from the concentrator 200 through the control pair 4CP1 and the circuit 600 to halt the supply of the mark pulses from the circuit 900 to the line concentrator 200. The crosspoint closure indication in combination with a crosspoint closure indication from the trunk switch 1000 causes the control circuit 900 to initiate a reset sequence returning the central office and the concentrators 200–9 to normal. The concentrators 200–9 receive a series of reset pulses from the control circuit 900 as soon as the crosspoint closure check is received therefrom. The central office is not, however, returned to normal until the crosspoint closure indication is also received from the trunk switch 1000.

As described above, during the time that the connection is being established in the concentrator 200, a connection is also being established in the trunk switch 1000 to the other end of the selected trunk 4T0. This sequence is also initiated by the marker 1008 when it seizes the frame control circuit 1200. The circuit 1200 supplies an indication of the horizontal group, vertical group and vertical file to the trunk switch 1000. When the trunk switch 1000 receives this information it provides an indication of which of the channels or connections to the trunk link frame 1001 are busy. This indication is supplied from the trunk switch 1000 to the line link connector 1010. If all the paths through the trunk switch 1000 are busy, the marker 1008 releases and initiates a reset sequence for returning the central office to normal. If paths or channels are available the marker 1008 selects one through the trunk switch 1000 and provides an operating potential through the connector 1010 to the trunk switch 1000 and through a trunk link connector 1006 to the trunk link frame 1001.

The trunk switch 1000 is inhibited until a memory check indication is provided from the circuit 700. As described above, this indication is also supplied to the outpulsing control circuit 900 before the mark pulses are supplied to the concentrator 200. If the memory check indication is not received at the trunk switch 1000, it does not operate and the marker 1008 times out and takes a trouble record. When the trunk switch 1000 operates to establish a connection from the trunk 4T0 through the switch 1000 and the trunk link frame 1001 to the originating register 1004, it provides a crosspoint closure indication to the outpulsing control circuit 900. When the outpusing control circuit 900 receives the crosspoint closure indication from the trunk switch 1000 and also the crosspoint closure indication from the line concentrator 200, it initiates a reset sequence for releasing the selector 710, the memory circuit 700 and the register 510. The line concentrators 200–9 were returned to normal after the concentrator crosspoint closure indication was received at the circuit 900. When the marker 1008 establishes the connection through the trunk switch 1000 to the register 1004, it releases and in turn releases the connectors 1010 and 1009 and the circuit 1200.

Service requests are not immediately recognized from the line concentrators 200–9 after scanning is resumed. Under control of the register 510, service requests are not recognized at any of the circuits 600–9 for a random interval in order to prevent one line in trouble to present a continuing demand which denies service to lines subsequent in the scanning cycle.

The sequence of operations for establishing a terminating connection responsive to a call to one of the subscriber lines 2L00, etc. is substantially the same as the sequence of operations for an originating call. The two main exceptions in the sequence involve making a line busy test in the memory circuit 700 and providing the trunk overflow indication from the trunk switch 1000 to the marker 1008 in the event all trunks are busy.

A terminating call is initiated when the marker 1008 seizes the frame control circuit 1200 through the line link connector 1010. When the marker 1008 seizes the frame control circuit 1200, it supplies thereto the horizontal group and line identities of the called line and also an indication that the call is a terminating call. If the call, for example, is to line 2L00 of the concentrator 200, the horizontal group, vertical group and vertical file indications are all 0. When the circuit 1200 registers this information it operates the concentrator control circuit 600 associated with the horizontal group 0 to halt the line scanning and to ready the central office for outpulsing the line and trunk identities to the concentrator 200. The sequence for outpulsing the line and trunk identities is exactly the same as for an originating call. The outpulsing control circuit 900 is operated by the circuit 600 to initiate the trunk and vertical group outpulsing. If the line 2L00 is idle, the outpulsing sequence continues with the line and trunk information being supplied to the concentrator 200.

If, however, the called line 2L00 is busy the memory circuit 700 disables the outpulsing control circuit 900. When the frame control circuit 1200 is seized, it initiates a line busy test of the called line 2L00 in the memory circuit 700. The memory circuit is checked and if the line 2L00 is busy, as indicated above, the circuit 900 is inhibited.

When the memory circuit 700 detects a line busy condition, it also provides a control potential to the control circuit 1200 which provides a line busy indication through the trunk switch 1000 and the line link connector 1010 to the marker 1008. When the marker 1008 receives the line busy signal it releases the frame control circuit 1200 and returns busy tone to the calling subscriber. When the frame control circuit 1200 releases, it operates the control circuit 900 to initiate a release sequence for resetting the central office to normal and for resuming normal scanning. The line concentrator system is, in this manner, returned to normal if the called line 2L00 is busy.

After an originating connection is established from one of the lines 2L00, etc. to the register 1004, the called party is dialed and a callback call is established from the calling line through one of the trunks 1012 or 1003 to the called party. For example, after the subscriber at the station 2S00 has finished dialing, the marker 1008 is seized by the originating register 1004 to initiate a callback sequence for establishing a connection from the selected trunk 4T0 to the called subscriber. The normal scanning sequence is not interrupted during the callback call as the connection remains established at the concentrator 200 from the line 2L00 to the trunk 4T0. It is necessary that the same trunk 4T0 be utilized for the talking connection through the outgoing trunk 1003 as was utilized for the originating call. In order to establish the callback connection it is necessary, therefore, to identify the trunk that is utilized for the dial-tone connection.

When the marker 1008 is seized, it in turn seizes the frame control circuit 1200 through the line link connector 1010 and supplies to it the line and concentrator identities and also an indication that the call is for a call-back. When the frame control circuit 1200 receives the line information it supplies this information to the memory circuit 700 and initiates a sequence therein for determining the identity of the trunk utilized for the originating connection. The memory circuit 700 determines which one of the trunks was utilized and supplies an indication thereof to the trunk selector circuit 710. At the same time the memory circuit 700 is operated, the frame control circuit 1200 initiates the operation of the selector circuit 710 for registering the identity of the trunk utilized for the originating call. When the selector circuit 710 registers the trunk identity, it supplies an indication thereof to the trunk switch 1000 which functions to extend the connection from the identified trunk to the trunk link frame 1001. The operating potential for the trunk switch 1000 is provided from the marker 1008 through the line link connector 1010. After the marker 1008 operates the trunk switch 1000 to complete a connection from the line 2L00 through trunk 4T0, the switch 1000 and the trunk link frame 1001 to the outgoing trunk 1003, the marker 1008 releases and in turn releases the frame control circuit 1200. When the circuit 1200 releases, it in turn releases the selector circuit 710 and the read-out circuitry, not shown, of the memory circuit 700.

The outpulsing circuit 900 is not operated during the callback sequence as the identity of the trunk utilized for the originating call is determined at the memory circuit 700. Moreover, as described above, line scanning is not halted.

After an originating or a terminating call to line 2L00 is completed, the subscriber at the station 2S00 hangs up to initiate a disconnect sequence for disconnecting the line 2L00 from the trunk to which it is connected. The disconnect sequence is initiated by the trunk switch 1000 which detects the disconnect request when the subscriber at the station 2S00 hangs up. The switch 1000 supplies an indication that a disconnect request has been initiated to the memory circuit 700. If the memory circuit 700 has a record of the connection, the combination of the request and the record in the memory circuit 700 causes a disconnect operation of the frame control circuit 1200. The memory circuit 700 provides an indication to the control circuit 1200 of the identity of a line concentrator from which the disconnect request initiated. When the circuit 1200 operates, it seizes the marker 1008 through the line link connector 1010 for handling the disconnect sequence. When the marker 1008 is seized, it functions to block the service of originating or terminating calls thereafter initiated from or to any of the subscriber lines 2L00, etc. during the disconnect sequence. The circuit 1200 also establishes a preference for serving disconnect requests initiated at the same time from two or more of the line concentrators 200–9.

After the circuit 1200 has determined which one of the concentrators to serve, it readies the outpulsing control circuit 900 for an outpulsing sequence to the concentrator from which the disconnect originated. The control circuit 1200 also provides a start potential to the selector circuit 710 for determining the identity of the trunk which is to be disconnected. The trunk selector circuit 710 consults the memory circuit 700 and determines the identity of the trunk to be disconnected. For example, suppose that the trunk to be disconnected is trunk 4T0 of the concentrator 200. During the trunk identification operation of the selector circuit 710 the control circuit 600 is operated by the frame control circuit 1200 to initiate the outpulsing sequence. The circuit 600 readies outpulsing paths from the circuit 900 to the line concentrator 200 and it halts normal scanning.

When the start signal is received at the control circuit 900, and the trunk selection operation is completed at the circuit 710, the outpulsing control circuit 900 functions to supply ten vertical group pulses and the trunk identifying pulses to the line concentrator 200. With the trunk 4T0 to be disconnected, only a single trunk identifying pulse is provided to the line concentrator 200. The vertical file pulses are not outpulsed from the circuit 900 to the concentrator 200. The trunk and vertical group outpulsing are started simultaneously so that the last trunk pulse arrives either simultaneously with or before the tenth vertical group pulse. The tenth vertical group pulse functions at the concentrator 200 as an indication that the outpulsing sequence is for disconnect instead of connect. The concentrator 200 has maintained an indication of the identity of the line to which the trunk 4T0 is connected because the operated cross-points between the line 2L00 and the trunk 4T0 are still operated. After the trunk and vertical group outpulsing is completed, the control circuit 900 supplies a number of mark pulses which function at the concentrator 200 to disconnect the line 2L00 from the trunk 4T0. When the disconnect is completed, a disconnect check pulse is returned to the circuit 900 which initiates a release sequence for returning the circuits 710, 600 and 900 to normal. A disconnect as well as a connect check pulse is advisable because the crosspoints in the concentrator 200 remain locked in the absence of operating current. The connect and disconnect pulses are both derived from the mark pulses and are of the same polarity over the control pair 4CP1.

When the control circuit 900 receives the disconnect check pulse from the concentrator 200, it causes the memory circuit 700 to erase the record of the connection established from the line 2L00 to the trunk 4T0. In this manner, the memory circuit 700 is erased after the actual disconnect at the line concentrator 200. When the memory circuit 700 erases the registration, it provides an indication that the information has been removed to the frame control circuit 1200 which releases and provides an indication of its release to the marker 1008.

DETAIL CIRCUIT DESCRIPTION

Figure 13:
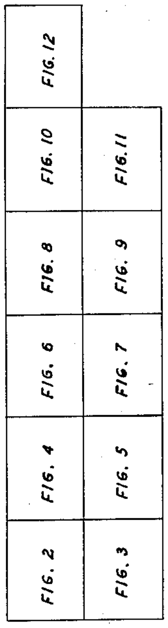
Fig. 13 illustrates the arrangement of Figs. 2 through 12.
Figure 2:
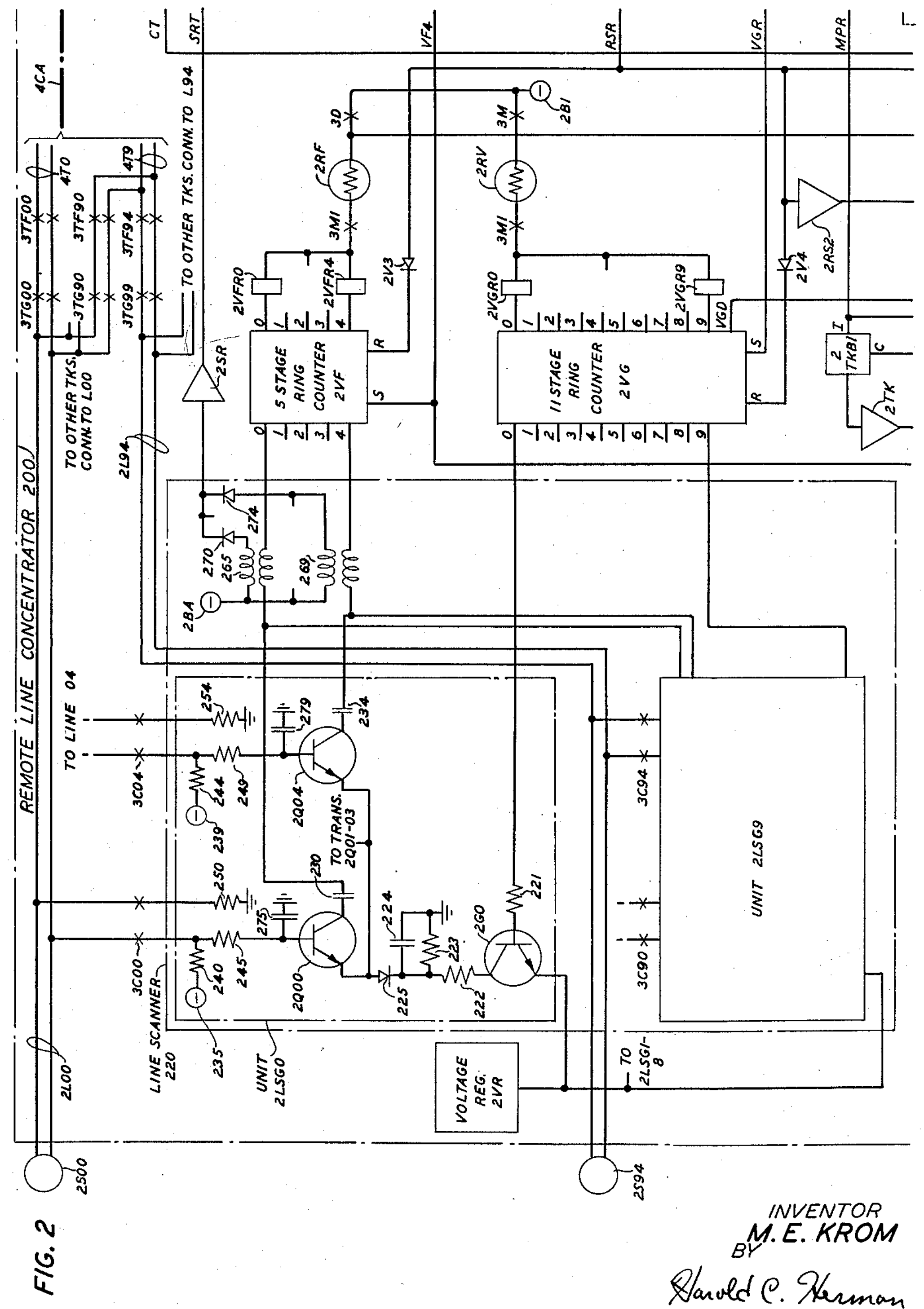

In the detail circuit drawing shown in Figs. 2 through 12, when arranged in accordance with Fig. 13, the relay contacts are shown detached from the relay windings. The first digit of each reference number indicates the figure in the detail circuit drawings in which the relay or component appears and the letters indicate the function thereof. Relay 8HGT0, for example, is the horizontal group relay 0 and appears in Fig. 8. The designation of the contact of a relay is generally the same as that of the relay even though it appears in a different figure. Contacts which are closed when the relay is deenergized are represented by a single short line perpendicular to the lines representing the connecting conductors, while contacts which are closed when the relay is operated are represented by an X crossing the connecting conductors. Contact 12CT1 in Fig. 8, for example, is a contact which is closed when the relay 12CT1 is deenergized and contact 3C00 in Fig. 2 is a contact which is closed when the relay 3C00 is operated. The contacts are shown detached from the relay windings in order for each functional circuit path to be shown and described in the simplest feasible manner.

*Normal scanning*

Figure 3:
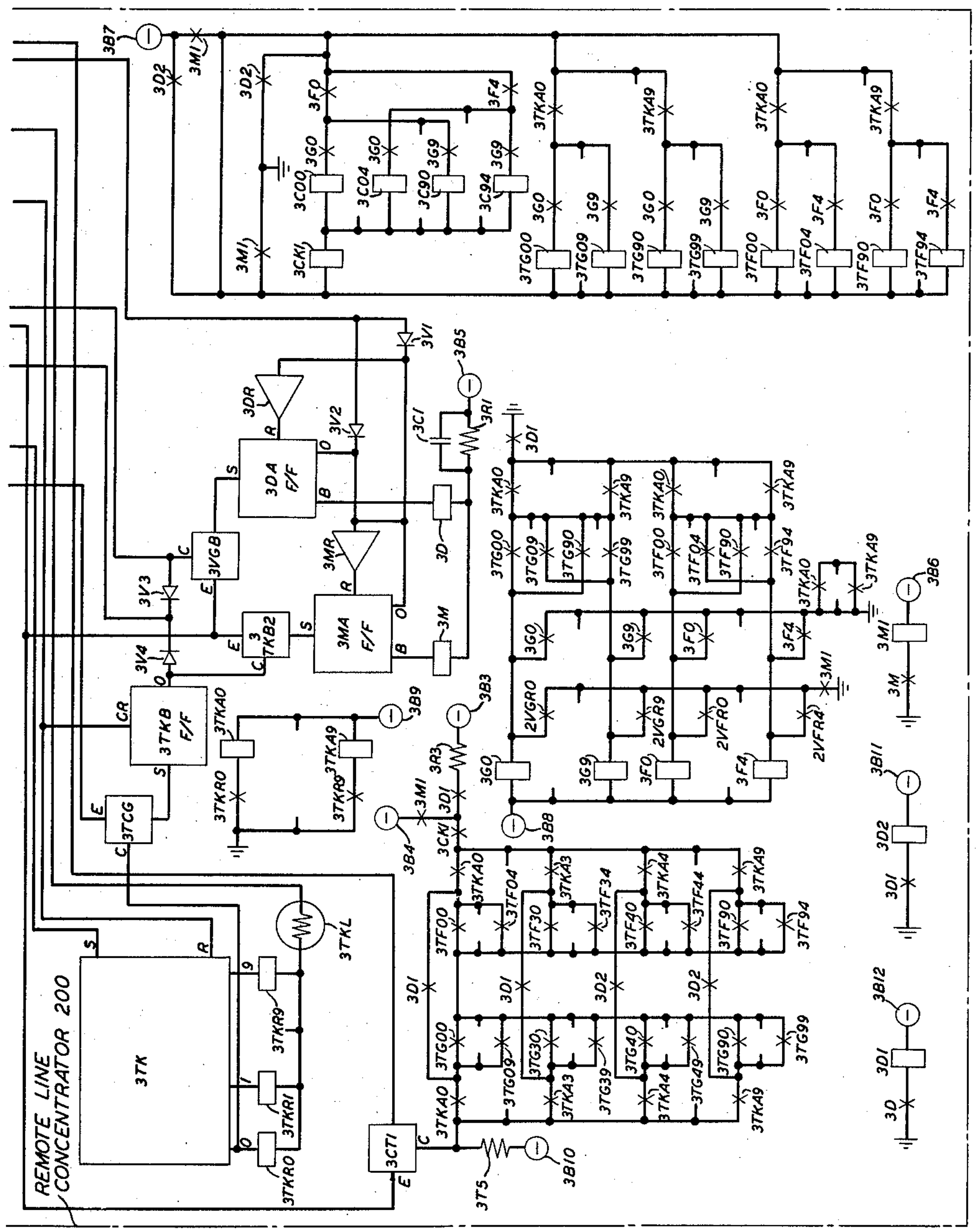
Figure 4:
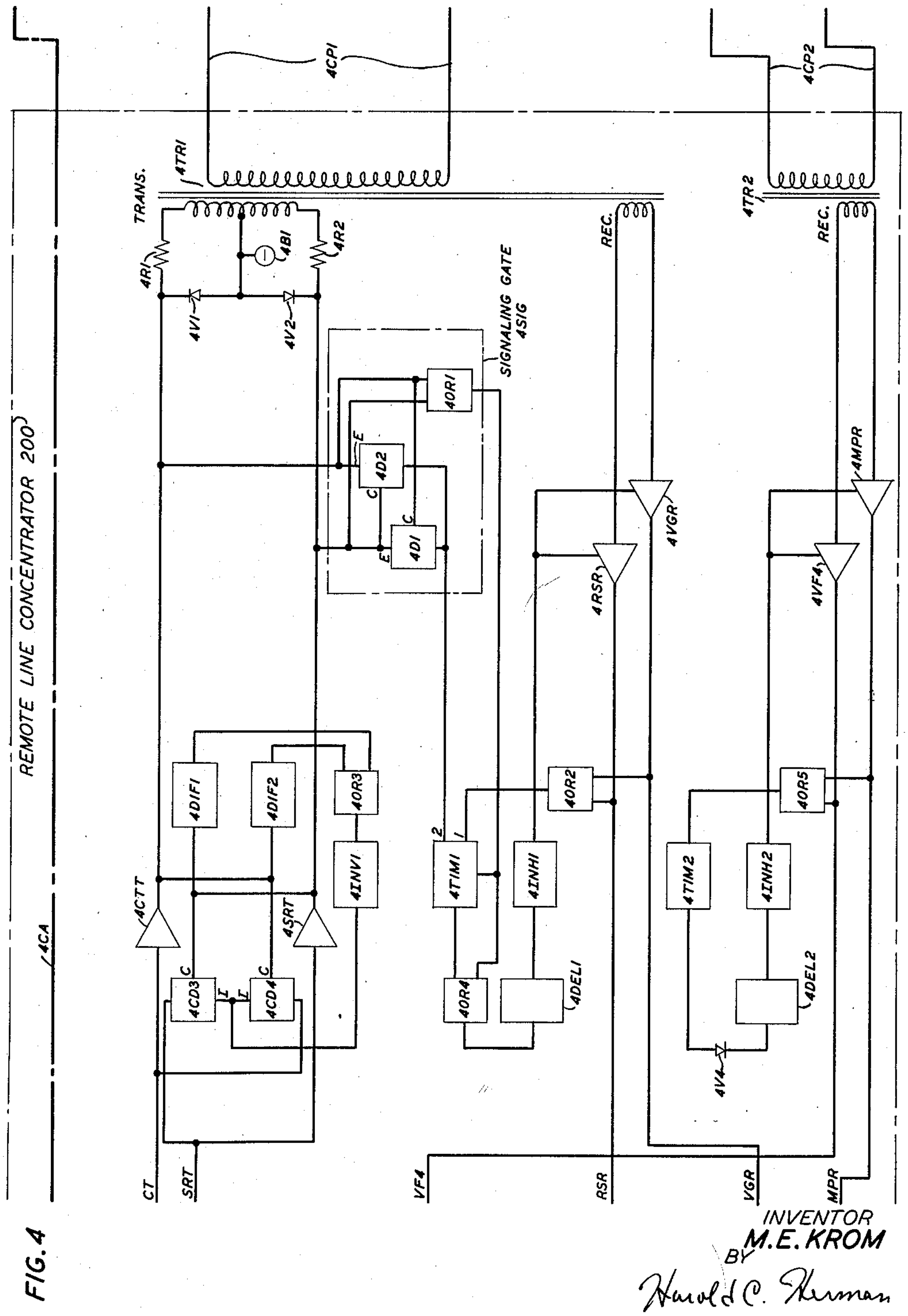
Figure 5:
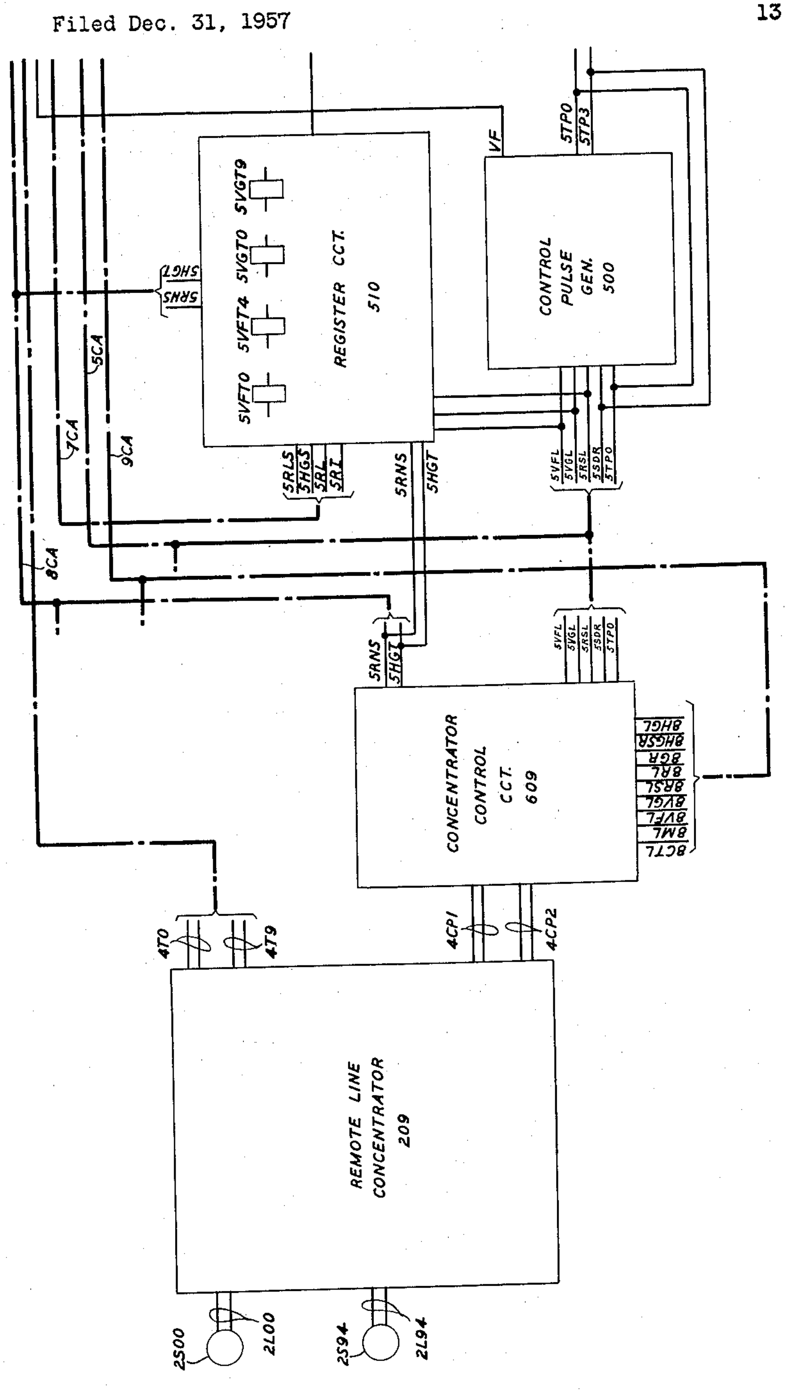

The line concentrator 200, shown in Figs. 2 through 4, is located at a remote location from a central office equipment shown in Figs. 6 through 12. As described above, ten line concentrators 200–9 are connected to the central office equipment. Only the line concentrator 200 is shown in detail with the concentrator 209 being shown as a box in Fig. 5. Each of the concentrators 200–9 provides for connections from fifty subscriber lines to the central office. The line concentrator 200 provides for connections from the fifty subscriber stations 2S00, etc. of which only the substations 2S00 and 2S94 are shown.

The designation of the substation is by vertical group and vertical file. The first of the last two digits indicates the vertical group identity and the last digit indicates the vertical file identity. The substation 2S94 therefore has a vertical group of nine and a vertical file of four. In all there are fifty substations connected to each of the concentrators 200–9.

The effect of utilizing the line concentrators 200–9 is to place a part of the switching equipment of the central office at a distance therefrom in order to conserve outside plant facilities. Each of the line concentrators 200–9 is connected to the central office by ten trunks 4T0–9 and two control pairs 4CP1—2. The trunks 4T0–9 provide talking pairs between the line concentrators 200–9 and the central office and the two control pairs 4CP1—2 provide for signaling pairs to and from the central office equipment. With fifty subscriber lines, such as line 2L00, connected to each of the ten line concentrators 200–9, there are a total of 500 subscriber lines which are served by the central office equipment shown in Figs. 6 through 12. With all 500 subscriber lines idle the central office continuously and synchronously scans the ten groups of fifty subscriber lines respectively connected to the ten concentrators 200–9.

Figure 6:
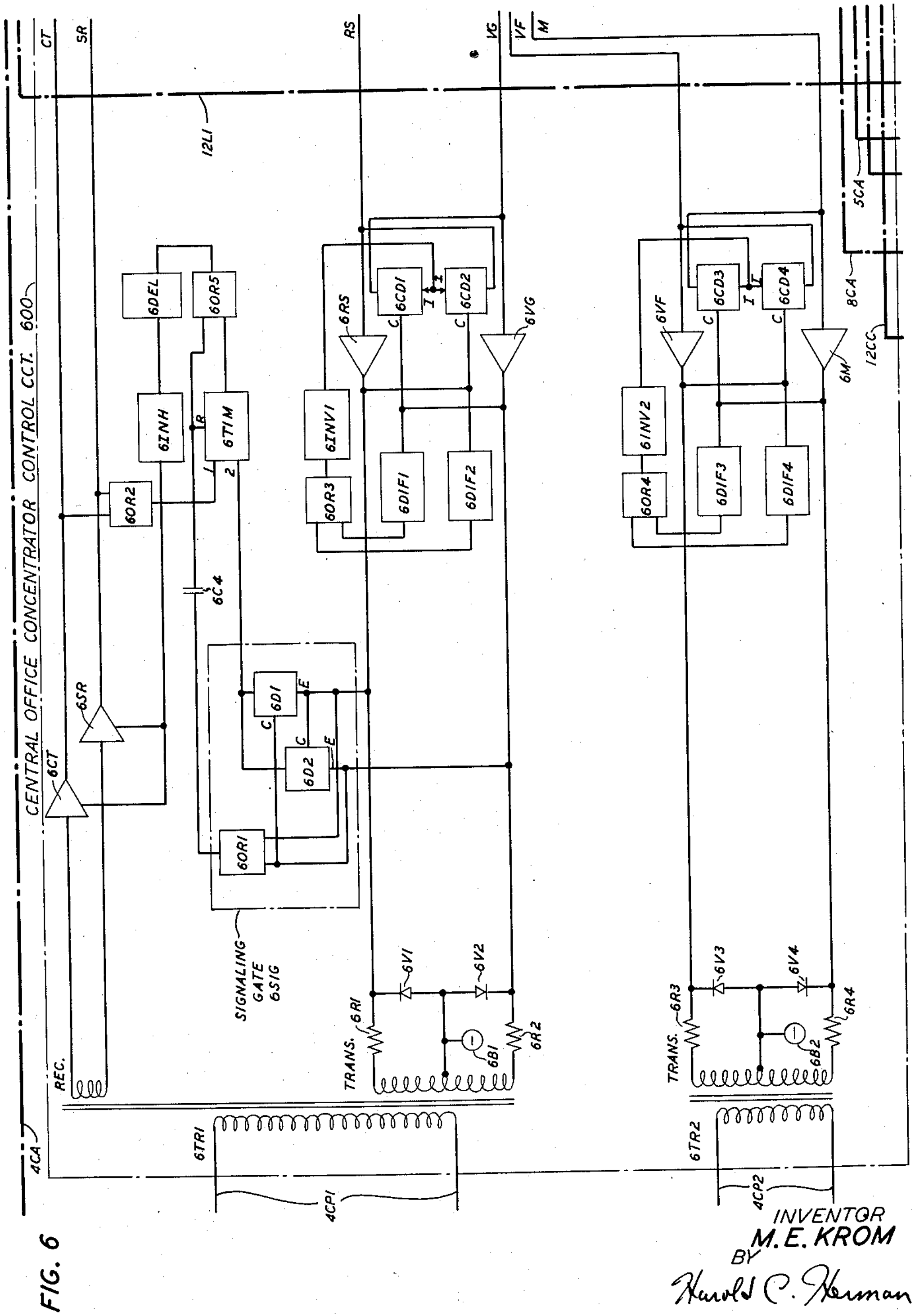
Figure 7:
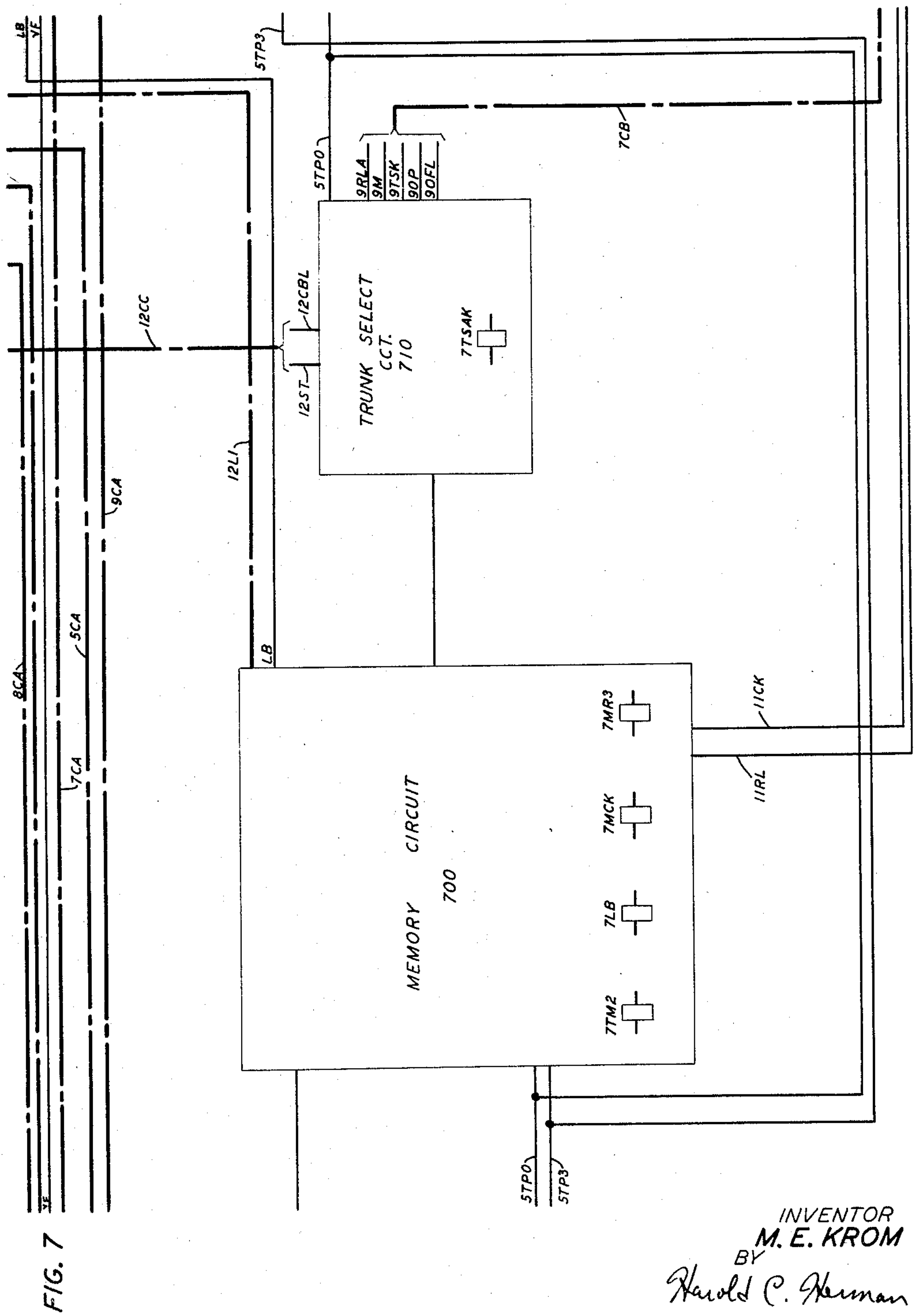
Figure 8:
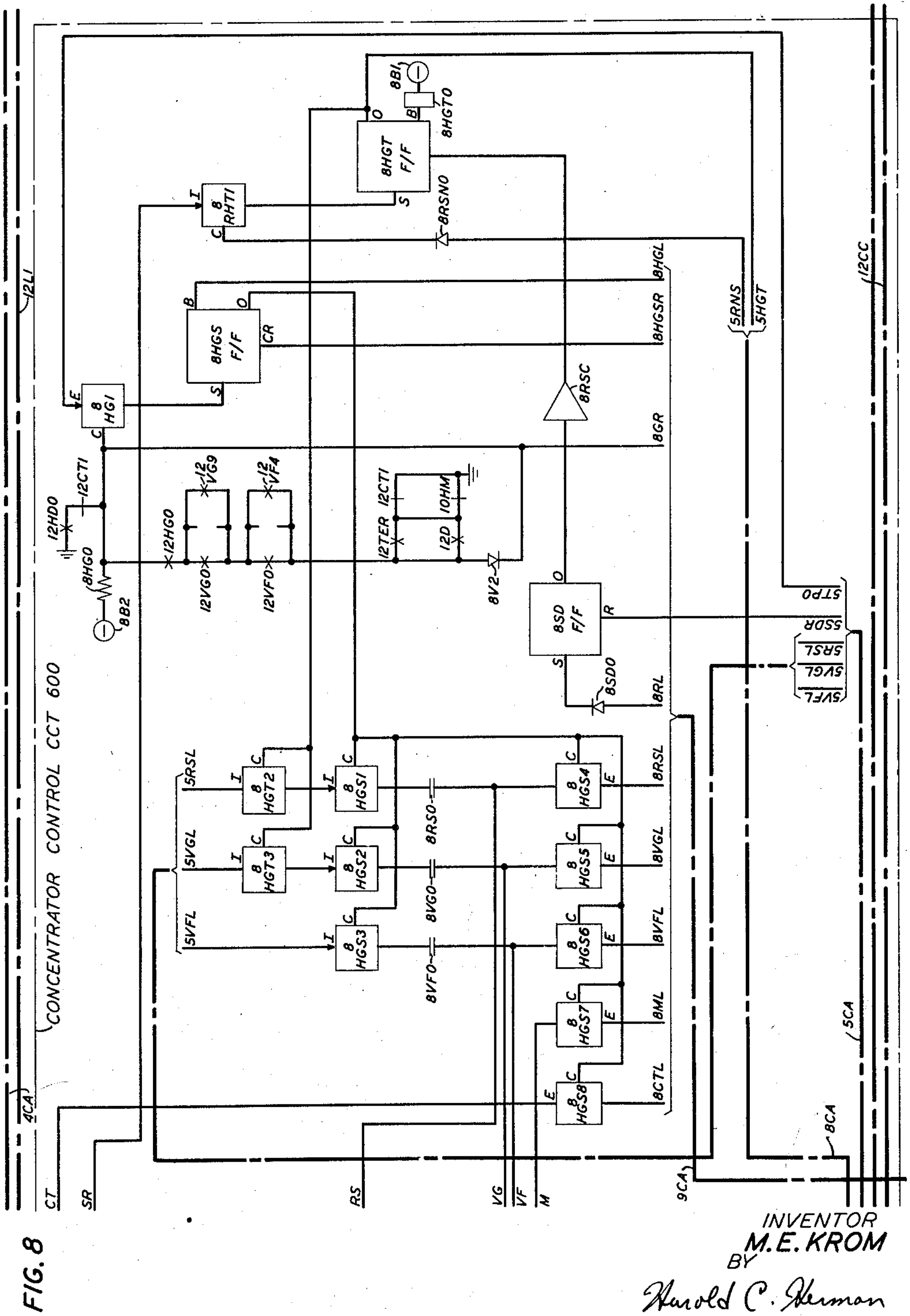
Figure 9:
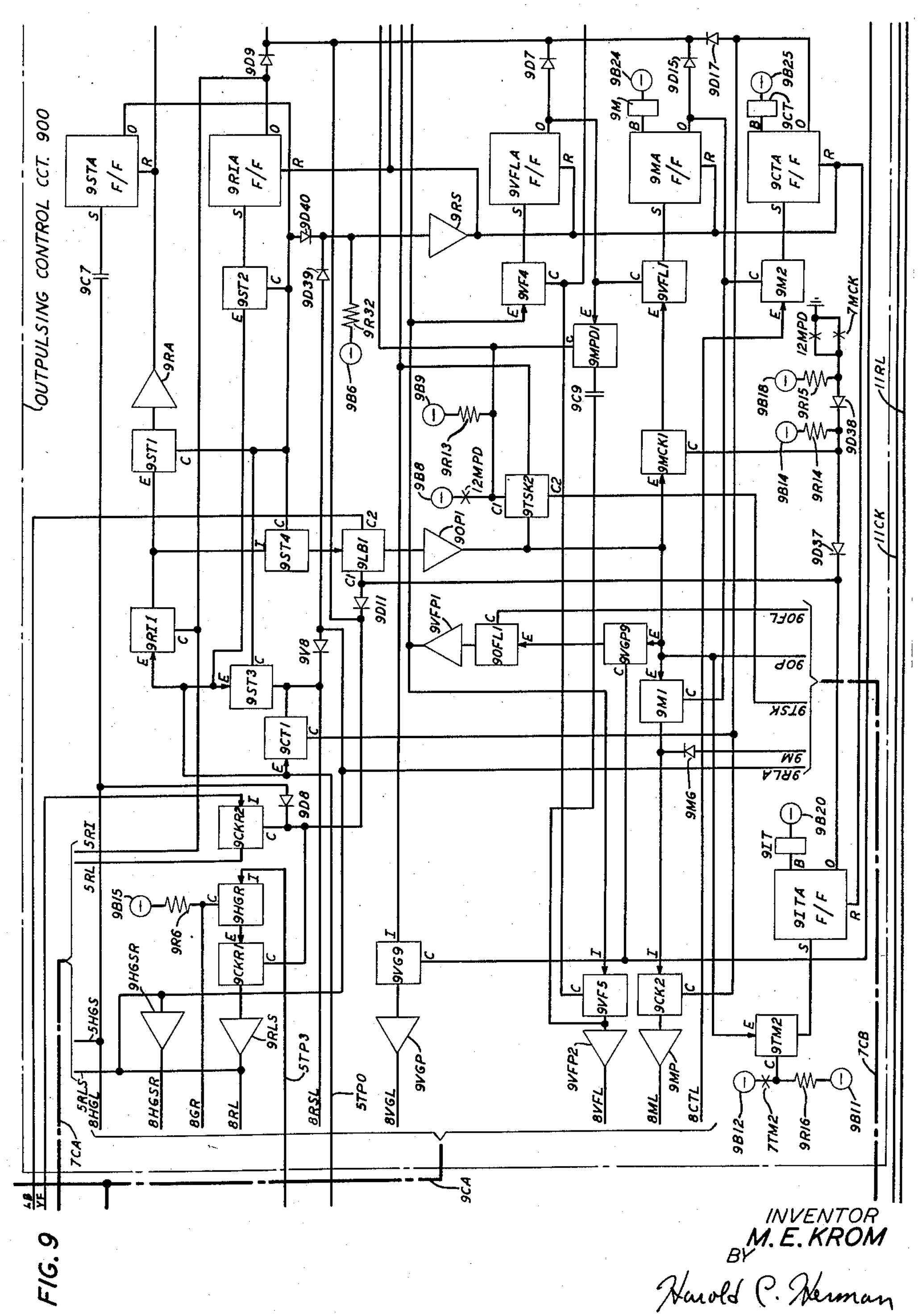

The ten line concentrators 200–9 are synchronously operated under conctrol of a pulse generator 500 which simultaneously provides scanning pulses through ten concentrator control circuits 600–9 and the ten sets of control pairs 4CP1—2 to the ten line concentrators 200–9. Only one, the concentrator control circuit 600, which is shown in Figs. 6 and 8, is illustrated in detail, and the concentrator control circuit 609 is shown as a box in Fig. 5. The pulse generator 500 also supplies the scanning pulses to a register 510 which is synchronously operated with the line concentrators 200–9. The concentrator control circuits 600–9 are individually associated with the concentrators 200–9, and the pulse generator 500 and the register 510 are common control equipment for all ten concentrators 200–9. The ten line concentrators 200–9 and the register 510 are synchronously and cyclically operated under control of the pulses from the generator 500. The generator 500, the register 510 and a number of other functionally represented circuits including circuits 700 and 1000 are described in detail in the copending patent application Serial No. 706,342 filed on even date herewith by Abbott-Krom-Mehring-Whitney.

The pulse generator 500 supplies four types of pulses: vertical group pulses, vertical file pulses, reset pulses and timing pulses. These pulses are illustrated in the pulse sequence diagram shown in Fig. 14. As in ordinary crossbar telephone systems the subscriber lines are arbitrarily arranged in groups designated vertical groups, vertical files and horizontal groups. All the subscriber lines connected to one of the ten concentrators 200–9 are in the same horizontal group, and each horizontal group is subdivided into ten vertical groups, each of which includes five vertical files. The vertical group pulses supplied by the generator 500 select a group of five lines connected to each of the concentrators 200–9. The vertical group pulse is supplied simultaneously to the ten line concentrators 200–9 so that five times ten or fifty subscriber lines are selected. Between two such vertical group pulses the pulse generator 500 supplies five vertical file pulses to the concentrators 200–9 to select one subscriber line connected to each of the concentrators or ten in all. In order to scan the 500 lines the pulse generator 500 provides to each of the ten line concentrators 200–9 and to the register 510, ten vertical group pulses spaced at intervals of 24 milliseconds and five vertical file pulses spaced at intervals of 4 milliseconds between each pair of vertical group pulses. The complate scanning cycle has a duration of 240 milliseconds.

In addition to the vertical group and vertical file pulses the generator supplies one reset pulse at the beginning of each cycle to insure the synchronous operation of the line concentrators 200–9 and the register 510 with the generator 500. Each reset pulse, as is hereinafter described, also functions as the first vertical group pulse so that only nine vertical group pulses are provided instead of ten for each cycle.

To briefly recapitulate, during each scanning cycle the pulse generator 500 supplies one reset pulse, nine vertical group pulses and fifty vertical file pulses. The pulse generator 500 also provides timing pulses at a rate of 500 and 250 pulses per second which are utilized, as hereinafter described, when a call to or from one of the 500 subscriber lines is being served. The pulse generator 500 provides pulses at rates of 500 pulses per second and 250 pulses per second. The 250 pulses per second are utilized for line scanning and the 500 pulses per second are utilized for outpulsing and for other control purposes. Line scanning is at a relatively low frequency of 250 pulses per second because of the propagation time of the signal through the sets of concentrator control pairs 4CP1—2 that connect the remote concentrators 200–9 with the central office. The sequences of pulses are such that when a vertical file pulse is sent from the central office the line is scanned and if the receiver is off-hook, a service request must be received back at the central office before the succeeding vertical file pulse is transmitted. This limitation establishes a maximum of 250 pulses per second for the scanning frequency. This limitation, however, does not exist during the outpulsing operation so that a speed of 500 pulses per second may be utilized to prevent increasing marker holding time.

The generator 500 is not stopped during the operating sequence of the line concentrator system of the present invention but continuously and cyclically generates the vertical file pulses through a lead 5VFL, the vertical group pulses through a lead 5VGL, the reset pulses through a lead 5RSL and timing pulses through leads 5TP3 and 5TP9.

The scanning pulses, which consist of the vertical file, vertical group and reset pulses, are supplied to the register 510 and through the concentrator control circuits 600–9 to the ten line concentrators 200–9. During the normal scanning sequence the concentrators 200–9 and the register 510 are cyclically operated under control of the control pulse generator 500. The timing pulses through lead 5TP0 are provided to the circuits 600–9, to the outpulsing control circuit 900, to the memory circuit 700 and to the trunk selector circuit 710. The pulses on lead 5TP3 are provided to the memory circuit 700 and to the outpulsing control circuit 900 and also through a lead 5SDR to the circuits 600–9.

The leads 5VFL, 5VGL and 5RSL from the generator 500 are multipled through a cable 5CA to each of the ten control circuits 600–9. In the circuit 600 the vertical file pulses through lead 5VFL are provided through an inhibiting gate 8HGS3, a capacitor 8VF0, an amplifier 6VF, a resistor 6R3, a transformer 6TR2 and the control pair 4CP2 to the line concentrator 200. An inhibiting gate is a three-terminal device which normally allows the passage of positive pulses from its input terminal I to its output terminal but which is inhibited to prevent their passage when a positive control potential is provided to the third or control terminal C. An enabling gate is a three-terminal device which normally inhibits the passage of positive pulses from its input terminal E to its output terminal but which allows their passage when a positive control potential is provided to its control terminal C. The designations E and I of the input terminals serve to identify the type of gate in the drawings. The component circuits utilized in the illustrative embodiment of the line concentrator system, including inhibiting gates, enabling gates, AND gates, OR gates, flip-flop circuits, amplifiers, ring counters, etc., are known, and circuits of this type are disclosed in the above-identified Joel-Krom-Posin patent. The vertical group pulses from the generator 500 through lead 5VGL are provided through inhibiting gates 8HGT3 and 8HGS2, a capacitor 8VG0, an amplifier 6VG, a resistor 6R2, a transformer 6TR1 and the control pair 4CP1 to the line concentrator 200. The reset pulses through lead 5RSL are provided through inhibiting gates 8HGT2 and 8HGS1, a capacitor 8RSO, an amplifier 6RS, resistor 6R1, the transformer 6TR1 and the control pair 4CP1 to the concentrator 200. The center tap of the primary winding of the transformer is connected to a battery 6B1 and through varistors 6V1—2 to the resistors 6R1—2. The center tap of the primary winding of the transformer 6TR2 is connected to a battery 6B2 and through varistors 6V3—4 to resistors 6R3—4. In this manner during the normal scanning sequence, the pulse generator 500 continuously and cyclically provides vertical group, vertical file and reset pulses to the register 510 and also to each of the ten line concentrators 200–9.

The amplifiers 6RS, 6VG and 6VF are square wave amplifiers providing a positive output pulse having a duration of 350 microseconds. The amplifiers 6RS and 6VG are connected to the opposite ends of one of the primary windings of the transformer or repeat coil 6TR1 and the amplifier 6VF and an amplifier 6M are connected to the opposite terminals of the primary winding of the transformer 6TR2. When any one of the amplifiers 6RS, 6VG, 6VF and 6M is turned off after its 350-microsecond duration, it triggers or operates the associated one of the amplifiers. For example, when the amplifier 6VG turns off, it triggers the amplifier 6RS which is associated therewith. The output of the amplifier 6VG is multiplied to a differentiating circuit 6DIF1 and to the control terminal C and an inhibiting gate 6CD1. The inhibiting gate 6CD1 includes timing means, not shown, which maintains the inhibited condition for a substantial interval approximately 100 microseconds after the inhibition potential is provided at its control terminal C. The circuit 6DIF1 differentiates the square output wave from the amplifier 6VG and provides a positive and a negative pulse to the OR gate 6OR3 which only passes negative pulses. The negative pulse derived therefor from the trailing edge of the positive output pulse from the amplifier 6VG is coupled through the OR gate 6OR3 and an inverter 6INV1 to the input terminals of two inhibiting gates 6CD1 and 6CD2. As described above, the gate 6CD1 is inhibited as its control terminal C is connected to the output of the operated amplifier 6VG. The control terminal C of the inhibiting gate 6CD2 is connected to the output of the amplifier 6RS which has not as yet operated. With the gate 6CD2 normal or enabled, the inverted pulse from the inverter 6INV1 is provided through the gate 6CD2 to the input of the amplifier 6RS.

When the amplifier 6RS is triggered, it provides a 350-microsecond positive pulse through the transformer 6TR1 and the control pair 6CP1 to the line concentrator 200. Since the two transmitting amplifiers 6VG and 6RS are coupled to the control pair 4CP1 through the opposite ends of the primary winding of the transformer 6TR1, the polarities of the two pulses transmitted through the control pair 4CP1 are opposite. In this manner, a pulse of one polarity is immediately followed by another pulse of the opposite polarity producing a combined signal which is referred to as a dipulse. When the amplifier 6RS provides the second part of the dipulse to the concentrator 200, it also inhibits the gate 6CD2 and provides the negative pulse derived from the trailing edge through a differentiating circuit 6DIF2 and the OR gate 6OR3 to the inverter 6INV1. With both of the inhibiting gates 6CD1 and 6CD2 inhibited because their associated amplifiers have just operated, neither of the amplifiers 6VG and 6RS is retriggered.

In a similar manner the two amplifiers 6VF and 6M function to provide dipulses to the line concentrator 200. When the amplifier 6VF is triggered, the trailing edge produces a negative pulse in a differentiating circuit 6DIF4 which is provided through an OR gate 6OR4 to an inverter 6INV2. The inverter 6INV2 provides a positive pulse through the normal inhibiting gate 6CD3 to the amplifier 6M which provides the second half of the vertical file dipulse. As is hereinafter described at the line concentrator 200, the identity of the pulses is determined by detecting the polarity of the first half of each dipulse. The second half of each dipulse is ignored.

When any one of the amplifiers 6RS and 6VG is triggered, two receiving amplifiers 6CT and 6SR are inhibited. The output of the amplifier 6VG is provided through an OR gate 6OR1 in a signaling gate 6SIG, a capacitor 6C4, an OR gate 6OR5, a delay circuit 6DEL to an inhibitor 6INH which provides an inhibiting potential to the amplifiers 6CT and 6SR. The pulse through the capacitor 6C4 also functions to reset a timer 6TIM if it is set or on at this time. The timer 6TIM functions to control the length of time that the inhibited condition of the receiving amplifiers 6CT and 6SR is maintained. In order to prevent reflection through the transformer 6TR1 when pulses are transmitted, the inhibition should last for 2.5 milliseconds. The first half of the dipulse functions to inhibit the amplifiers 6CT and 6SR and the second half of the dipulse functions to operate the timer 6TIM which maintains the inhibition for the 2.5-millisecond interval. Two gates 6D1 and 6D2 in the signaling gate 6SIG gate the outputs of the transmitting amplifiers 6RS and 6VG. The amplifiers 6RS and 6VG are connected respectively to the input terminals E of the gates 6D1 and 6D2 and to the control terminal C of the gates 6D2 and 6D1. In other words, the enabling gate for one of the amplifiers 6RS and 6VG is controlled by the other one of the amplifiers 6RS and 6VG. When the amplifier 6VG turns on, it enables the gate 6D1 and does not provide a pulse through the gate 6D2 which is normal. The enabled condition is maintained by timing means in the gate 6D1 so that when the amplifier 6RS is triggered, its output passes through the gate 6D1 to the input terminal 2 of the timer 6TIM. In this manner the timer 6TIM goes on when the second half of the dipulse is transmitted. The timer provides a 2.5-millisecond pulse through the inhibitor 6INH to the amplifiers 6CT and 6SR. If the timer 6TIM is not yet off when the first half of a dispulse is transmitted, as will happen as in hereinafter described when pulses are transmitted at a rate of 500 pulses per second, the first half of the dipulse functions to reset the timer 6TIM. The timer 6TIM is then triggered again when the second half of the dipulse is transmitted. Only the first half of the dipulse functions as a reset pulse as the capacitor 6C4 remains charged when the second half is provided thereto so that an additional reset pulse is not provided to terminal R of the timer 6TIM. In this manner the pulse through one of the gates 6D1 and 6D2 functions to operate the timer 6TIM. When the transmission rate is at 500 pulses per second, the timer 6TIM goes on when the second half of the dipulse is transmitted and is turned off when the first half of the succeeding dipulse is transmitted. The inhibitor 6INH is, in this manner, energized continuously during the 500 pulses per second operation being energized either from the timer 6TIM or from the first half of each dipulse.

At the line concentrator 200, the identity of each dipulse is determined by identifying the polarity of its first half. If its first half is positive, one of two amplifiers is operated, and if it is negative, the other operates. The control pair 4CP1 is connected through the transformer 4TR1 to the receiving amplifiers 4RSR and 4VGR and the control pair 4CP2 is connected through the transformer 4TR2 to the receiving amplifiers 4VFR and 4MPR. The amplifier 4VGR responds to vertical group pulses; the amplifier 4RSR responds to reset pulses; the amplifier 4VFR responds to vertical file pulses; and the amplifier 4MPR responds to mark pulses which are hereinafter described. The output of each of the amplifiers 4RSR, 4VGR, 4VFR and 4MPR is a square wave positive pulse having a duration of 40 microseconds. When any one of these amplifiers is operated, it provides for an inhibiting potential to its associated amplifier after an interval of 40 microseconds. For example, when the amplifier 4VGR operates, it provides for an operating potential through an OR gate 4OR2 to the input terminal 1 of a timer 4TIM1. The timer provides an inhibiting potential through an OR gate 4OR4 and a delay circuit 4DEL1 to an inhibitor 4INH1. The inhibitor 4INH1 provides an inhibiting potential to the amplifiers 4RSR and 4VGR which arrives thereat 40 microseconds after the amplifier 4VGR is operated. The output pulse from the amplifier 4VGR therefore has a duration of 40 microseconds. Normally, if the receiver were allowed to turn off by itself, its pulse duration would be somewhat longer. When the amplifier 4RSR is operated, it provides for a similar sequence for inhibiting itself and the amplifier 4VGR. The amplifiers 4VFR and 4MPR similarly provide for an inhibition after 40 microseconds. The amplifiers 4VFR and 4MPR are connected to an OR gate 4OR5 which provides an operating potential to the timer 4TIM2. The timer 4TIM2 provides an inhibiting potential through a varistor 4V4 and a delay circuit 4DEL2 to an inhibitor 4INH2. The inhibitor 4INH2 provides the 40-microsecond delay inhibition potential to the amplifiers 4VFR and 4MPR. By providing for an inhibition potential which is delayed by 40 microseconds, the second half of each dipulse is ignored at the concentrator 200. The identity of the dipulse is, in this manner, determined by recognizing the polarity of the first half of the dipulse. The advantage of using dipulses is that undesirable effects of low frequency cut-off is greatly reduced since most of the direct-current components are eliminated or canceled. Degradation of sensitivity due to changes in the direct-current or zero reference level is therefore avoided.

Each of the line concentrators 200–9 includes two ring counters 2VF and 2VG which are cyclically and synchronously operated under control of the scanning pulses from the pulse generator 500. A ring counter is a walking circuit or a sequence circuit which advances one step for every input supplied thereto. The vertical file pulses through the control pair 4CP2 are provided in the concentrator 200 from the receiving amplifier 4VFR, to the input terminal S of the five-stage ring counter 2VF. The vertical group pulses through the control pair 4CP1 are provided from the receiving amplifier 4VGR to the input terminal S of the eleven-stage counter 2VG. The eleventh stage VGD, as is hereinafter described, is utilized during the disconnect sequence. The reset pulses through the control pair 4CP1 are provided from the receiving amplifier 4RSR through varistors 2V3—4 to the reset terminals R of the counters 2VF and 2VG. The reset pulses are also respectively provided from the amplifier 4RSR through varistors 3V1—2 and amplifiers 3DR and 3MR to the reset terminals R of flip-flop circuits 3DA and 3MA. During the scanning sequence after the counter 2VG steps to stage 9, the reset pulse functions to reset it to stage 0. The stage VGD is not utilized during the scanning sequence. The pulses supplied to the input terminals S of the ring counters 2VF and 2VG function to step them from one stage to the next. Assuming that the five-stage ring counter 2VF is set at its stage 0, the first pulse steps it to its stage 1. As indicated in Fig. 2, the ring counters 2VF and 2VG have two output terminals 0, two output terminals 1, etc. The two similarly designated terminals are outputs from the same stage with the potential conditions thereon being the same but are shown separately to indicate that they are isolated outputs.

The counters 2VF and 2VG are driven by the scanning pulses from the central office to cyclically scan the fifty lines 2L00, etc. When an output or step potential is provided on one of the leads 0–9 of the group counter 2VG, it operates an associated one of ten transistors 2G0–9 located respectively in ten similar scanning units 2LSC0–9. The scanning units 2LSC0–9 are in a transistor line scanner 220 which is driven by the counters 2VF and 2VG to determine the service conditions of the fifty subscriber lines 2L00, etc. The line scanner 220 is of the type described in detail in the above-identified disclosure by G. F. Abbott, Jr. The ten output terminals 0–9 of the group counter 2VG are connected respectively to the ten units 2LSG0–9 in the scanner 220.

Referring to the unit 2LSG0 which is shown in detail, the transistor 2G0 is an NPN junction transistor having its base electrode connected through a base resistor 221 to the terminal 0 of the counter 4VG, its emitter electrode connected to a voltage regulator 2VR and its collector electrode connected through a resistor 222 and a varsitor 225 to the emitter electrodes of five junction transistors 2Q00–04. The junctions between the resistor 222 and the varistor 225 is connected through a resistor 223 and also through a capacitor 224 to ground. Each of the group transistors 2G0–9 is multiplied to five gate transistors 2Q00–04. In all there are fifty gate transistors which are associated individually with the fifty lines 2L00, etc., with lines 2L00–04 and their associated transistors 2Q00–04 being in vertical group 0.

As described above, the emitter electrodes of the ten transistors 2G0–9 are multiplied to the voltage regulator 2VR. The voltage regulator 2VR is a low impedance source of reference voltage which is utilized for regulating the sensitivity of the transistor gates including, respectively, the ten sets of NPN junction transistors 2Q00–04. The more negative the potential supplied by the regulator 2VR, which is adjustable, the more sensitive are the transistors 2Q00–04 to potential changes across the lines 2L00, etc.

Assume by way of example that the potential provided by the voltage regulator 2VR is minus 18 volts. The emitter electrodes of the transistors 2G0–9 are therefore at the minus 18-volt regulator potential. The base-to-emitter junction of only one of the transistors 2G0–9 is forward biased at any time since the normal potential at the leads 0–9 of the ring counter 2VR is minus 24 volts. The step potential cyclically provided at the output terminals 0–9 is minus 8 volts so that the transistors 2G0–9 are successively saturated. When a step potential is provided at terminal 0 of the counter 2VG, the transistor 2G0 becomes conductive. The impedance between the collector electrode and the emitter electrode of the transistors 2G0–9 is high when the associated stage of the ring counter 2VG is off and is essentially a short circuit when the associated stage is on. The current path through the collector and emitter electrodes of the transistor 2G0 is from ground through the resistors 223 and 222 and the collector and emitter electrodes of the transistor 2G0 to the regulator 2VR. When the transistor 2G0 is saturated, the potential supplied to the transistors 2Q00–04 in the unit 21LSG0 is approximately two-thirds the voltage supplied from the voltage regulator 2VR due to the voltage divider effect of resistors 223 and 222. With a regulator voltage of minus 18 volts, a minus 12-volt potential is provided to the emitter electrode of each of the five transistors 2Q00–04. The potential normally provided to the emitter electrodes of the transistors 2Q00–04 is ground potential due to the connection of the emitter electrodes through the varistor 225 and the resistor 223 to ground.

When the transistor 2G0 is saturated, the potential at the emitter electrodes of the transistors 2Q00–04 changes from ground potential to the minus 12-volt potential which is equal to two-thirds the potential supplied from the regulator 2VR. The minus 12-volt potential at the emitter electrodes of the transistors 2Q00–04 is insufficient to initiate conduction because the emitter-base junctions of transistors 2Q00–04 are normally reverse biased, respectively, by a minus 24-volt potential from sources 235–39. The base electrodes of the five transistors 300–04 are connected respectively through resistors 245–49 and resistors 240–44 to the minus 24-volt potential sources 235–39. The resistors 245–49 are also connected respectively through operated contacts of relays 3C00–04 to the ring leads of the lines 2L00–04. The line concentrator 200 includes fifty cut-off relays 3C00, etc. that are individually associated with the fifty subscriber lines 2L00, etc. The relays 3C00, etc. are magnetically latched relays of the type disclosed in the above-identified disclosure by G. E. Perreault. The relays 3C00, etc., which are normally in an operated condition, are reset, as is hereinafter described, to disconnect the line scanner 220 and provide a clear tip and ring connection for any calling one of the lines 2L00, etc.

Returning to the scanning sequence and assuming that the line 2L00 is idle with the receiver on-hook, the resistance between the tip and the ring leads of the line 2L00 will be large and the potential at the base electrode of transistor 2Q00 will be minus 24 volts. The tip leads of the lines 2L00, etc. are connected respectively through operated contacts of the relays 3C00, etc. and ten sets of resistors 250–54 to ground. When the line 2L00 is idle, the base potential is determined by the battery 235. The resistors 250–54 function to protect the contacts of the relays 2C00–04 from excessive currents due to foreign potentials, and capacitors 275–79, connected respectively between the base electrodes of transistors 2Q00–04 and ground, serve to reduce the effects of alternating-current interference and to absorb transient surges due to lightning, etc. The varistor 225 functions to protect the emitter junctions of the line transistors 2Q00–04 against breakdown due to excessive reverse bias. The emitter junctions are normally reverse biased by 24 volts and have a breakdown potential of approximately 40 volts. The varistor 225 provides an additional protection as its breakdown potential is also approximately 40 volts. Since the emitter electrode of transistor 2Q00 is at minus 12 volts, which is more positive than the minus 24-volt potential at the base electrode, conduction through the transistor 2Q00 is inhibited and the emitter-collector junction impedance is high.

The transistor gate including the transistor 2Q00 is, in this manner, disabled when the associated line 2L00 is idle so that a pulse to the collector electrode of transistor 2Q00 is inhibited. The pulses, which are supplied to the collector electrodes of the ten sets of transistors 2Q00–04, are vertical file step pulses supplied from the five-stage ring counter 2VF respectively through the primary windings of five transformers 265–69 and five capacitors 230–34. The secondaries of the transformers 265–69 are connected between a battery 2BA and an OR circuit arrangement consisting of five varistors 270–74. If a vertical file pulse from the counter 2VF can pass through the primary winding of the associated one of the transformers 265–69, an amplifier 2SR, which is connected to the varistors 270–74, supplies the pulse induced in the secondary winding as a service request indication. A pulse is allowed to pass through the primary winding of one of the transformers 265–69 only when one of the line transistors 2Q00–04 connected thereto is saturated. The transformers 265–69 are connected respectively to ten of the transistors 2Q00–04. The transformer 265, for example, is connected to the transistor 2Q00 in each of the ten units 2LSG0–9. If any one of these ten transistors 2Q00 is saturated when the vertical file pulse 0 is supplied, a service request indication is recognized. The identity of the line, which initiates the service request, is determined by its time position in the scanning cycle. With line 2L00 idle, the positive vertical file pulse from terminal 0 of the counter 2VF is blocked at the transistor 2Q00. The absence of an input pulse to the amplifier 2SR functions as an indication that line 2L00 is idle.

If all ten sets of fifty lines 2L00, etc. remain idle, the scanning sequence continues under control of the three sets of pulses, the vertical group, the vertical file and the reset pulses from the central office. In each of the line concentrators 200–9 each vertical group pulse readies one of the scanning units 2LSG0–9 and each vertical file pulse scans one of the five lines associated therewith. In this manner the five lines are successively scanned by the five vertical file pulses which occur between two of the vertical group pulses. At the time position for the first vertical group pulse, the vertical group pulse is actually omitted, as described above, and a reset pulse is transmitted from the central office to insure that the counters 2VG and 2VF are in the start position.

*Originating call*

When a call is initiated at one of the substations 2S00, etc., a vertical file pulse from the ring counter 2VF is transformed by one of the scanning units 2LSG0–9 to a service request pulse. For example, if the call originates at line 2L00, the scanning unit 2LSG0 functions to provide a service request pulse to the amplifier 2SR.

When the line 2L00 assumes a service request condition with the receiver off-hook, the resistance across the tip and ring leads of the line 2L00 becomes relatively low so that the base electrode of the transistor 2Q00 in the unit 2LSG0 is near ground potential. The resistors 240 and 250 function together with the line impedance as a voltage divider to determine the potential at the base electrode of transistor 2Q00. The potential at the base electrode changes to a value near ground potential when the line 2L00 assumes the service request condition because the resistance of the resistor 240 is much larger than that of the resistor 250. With the base electrode of transistor 2Q00 near ground potential and the emitter electrode of transistor 2Q00 at minus 12 volts due to the operation of the transistor 2G0, the emitter-base junction is forward biased to allow base current through the transistor 2Q00. With base current through the transistor 2Q00, the impedance between its collector and emitter electrodes becomes very small. When the associated stage 0 of the ring counter 2VF is thereafter operated or turned on, a pulse is supplied from terminal 0 of the counter 2VF through the primary winding of transformer 265, capacitor 230, the collector-to-emitter path of transistor 2Q00, varistor 225 and resistor 223 shunted by capacitor 224 to ground. The pulse through the primary winding of the transformer 265 induces a pulse in the secondary winding of the transformer 265 which is supplied through the varistor 270 to the service request amplifier 2SR.

The amplifier 2SR supplies the service request pulse through the transmitting amplifier 4SRT, a resistor 4R1, the transformer 4TR1 and the control pair 4CP1 to the concentrator control circuit 600 in the central office. The center tap of the primary winding of the transformer 4TR1 is connected to a battery 4B1 and through varistors 4V1—2, respectively, to resistors 4R1—2 connected to the opposite terminals of the primary winding. The amplifier 4SRT functions to operate its associate amplifier 4CTT to provide for a dipulse in a manner similar to that described above. The square wave from the amplifier is differentiated by a circuit 4DIF2 and the negative pulse is provided through an OR gate 4OR3 to an inverter 4INV1. The inverter 4INV1 provides an operating potential through the normal gate 4CD4 to trigger the amplifier 4CTT. The amplifier 4CTT provides the second half of the service request dipulse.

The amplifiers 4SRT and 4CTT function to inhibit the receiving amplifiers 4RSR and 4VGR by providing control potentials through the signaling gate 4SIG. The gate 4SIG is similar to the gate 6SIG described above. The first half of the dipulse is provided through the gate 4OR1 of the gate 4SIG, the OR gate 4OR4 and the delay circuit 4DEL1 to the inhibitor 4INH1, and the second half of the dipulse is provided through the gate 4D2 to the timer 4TIM1 which supplies another operating potential to the inhibitor 4INH1. The inhibitor 4INH1 disables the amplifiers 4VGR and 4RSR.

In the control circuit 600, the service request pulse is coupled through the transformer 6TR1 to the receiving amplifier 6SR. The amplifier 6SR detects the pulse and provides a 40-microsecond positive output pulse under control of the inhibitor 6INH. The inhibitor 6INH is operated by the timer 6TIM, which is in turn operated by the amplifier 6SR, through the OR gate 6OR2. The inhibitor 6INH disables the receiving amplifier 6CT so that the second half of the dipulse is not amplified. The amplifier 6SR provides the 40-microsecond service request indication through an inhibiting gate 8RHT1 to the input terminal S of a flip-flop circuit 8HGT. The circuit 8HGT, which is set by the service request pulse, initiates a sequence of operations for selecting an idle one of the trunks 4T0–9 and for establishing a connection from the service requesting line 2L00 through the selected trunk, the trunk switch 1000 and the trunk link frame 1001 to an originating register 1004 which supplies dial tone. When the circuit 8HGT is set, it disables the gates 8HGT2 and 8HGT3 to block the vertical group and reset pulses to the line concentrator 200, and it provides a control potential through a lead 5HGT, which is part of cable 8CA, to the control circuits 601–9 and also to the register circuit 510. The control potential on lead 5HGT functions to halt the transmission of the vertical group and reset pulses through the circuits 601–9 and to halt the register 510 at the identity of the calling line 2L00. The gates 8HGT2 and 8HGT3 are disabled as their control terminals C are multipled to an output terminal of the circuit 8HGT. The output terminal 0 is connected to the control terminals C of the gates 8HGT2 and 8HGT3 and to the lead 5HGT and the output terminal B is connected to the winding of a relay 8HGT0.

The register 510 is halted, in this manner, to register the calling line identity or in a position corresponding to a number of the calling subscriber. When the register 510 is halted, it also provides an inhibiting potential to a lead 5RNS. The lead 5RNS is connected in each of the circuits 600–9 through a varistor 8RNS0 to the control terminal C of the inhibiting gate 8RHT1. The gate 8RHT1 is in the service request path to the circuit 8HGT so that service requests are not recognized even though scanning is resumed as long as the inhibition potential remains on lead 5RNS.

When the flip-flop circuit 8HGT in the control circuit 600 operates, in addition to stopping the register 510, it also operates the associated relay 8HGT0, the winding of which is connected between the output terminal B of the circuit 8HGT and a battery 8B1. The circuits 600–9 include, respectively, the relays 8HGT0–9 which function to identify the associated one of the concentrators 200–9 from which the service request originated.

When the relay 8HGT0 operates, it supplies the identity of the line concentrator 200 to a line link connector 1010 by connecting ground in a frame control circuit 1200 thereto. When the register 510 is halted, it registers the line identity by operating the relays 2VGT0 and 5VFT0 and it supplies the vertical group and vertical file identities of the calling line 2L00 respectively to the connector 1010 and to a marker connector 1009 by extending ground connections thereto from the circuit 1200.

Figure 10:
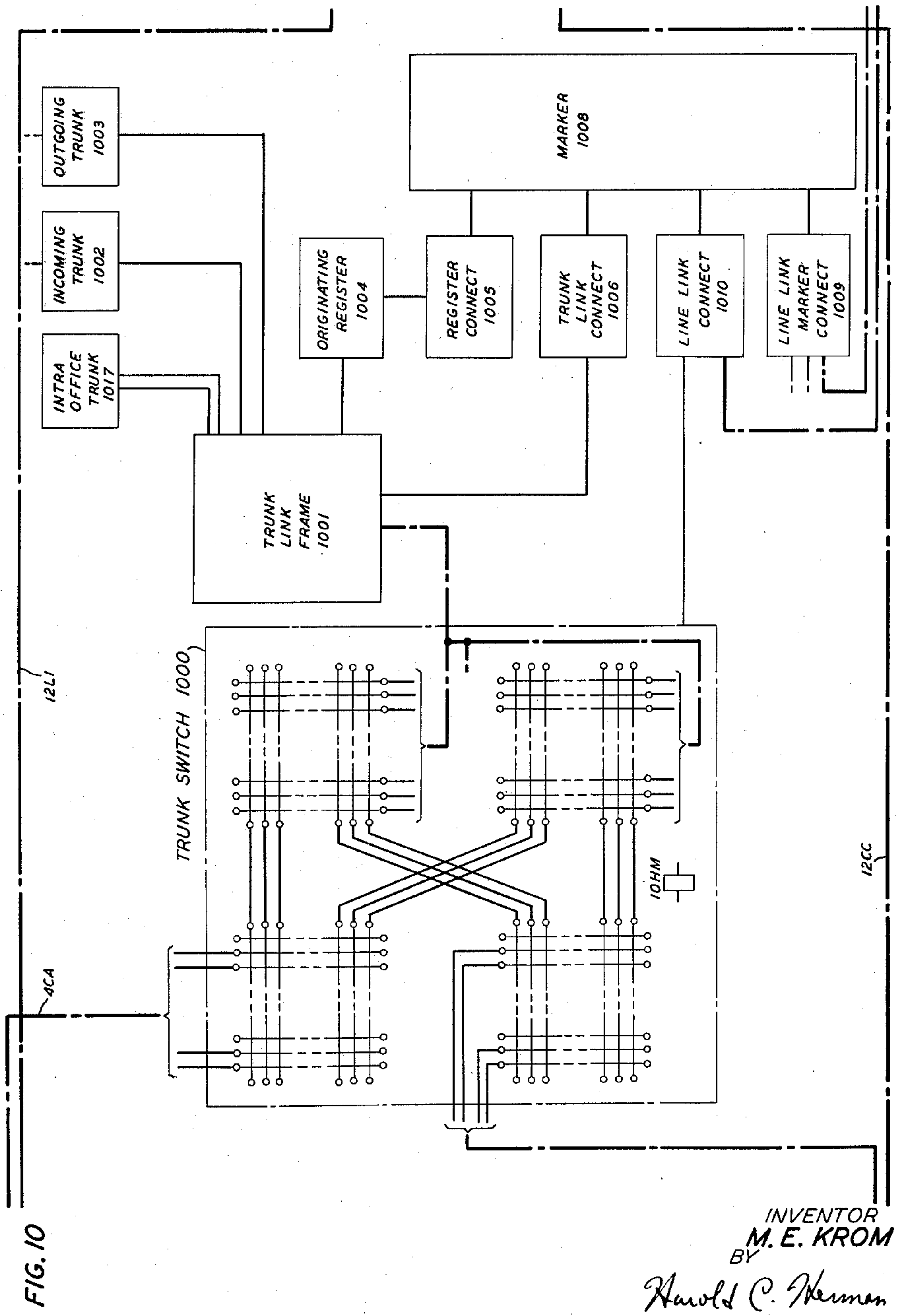
Figure 11:
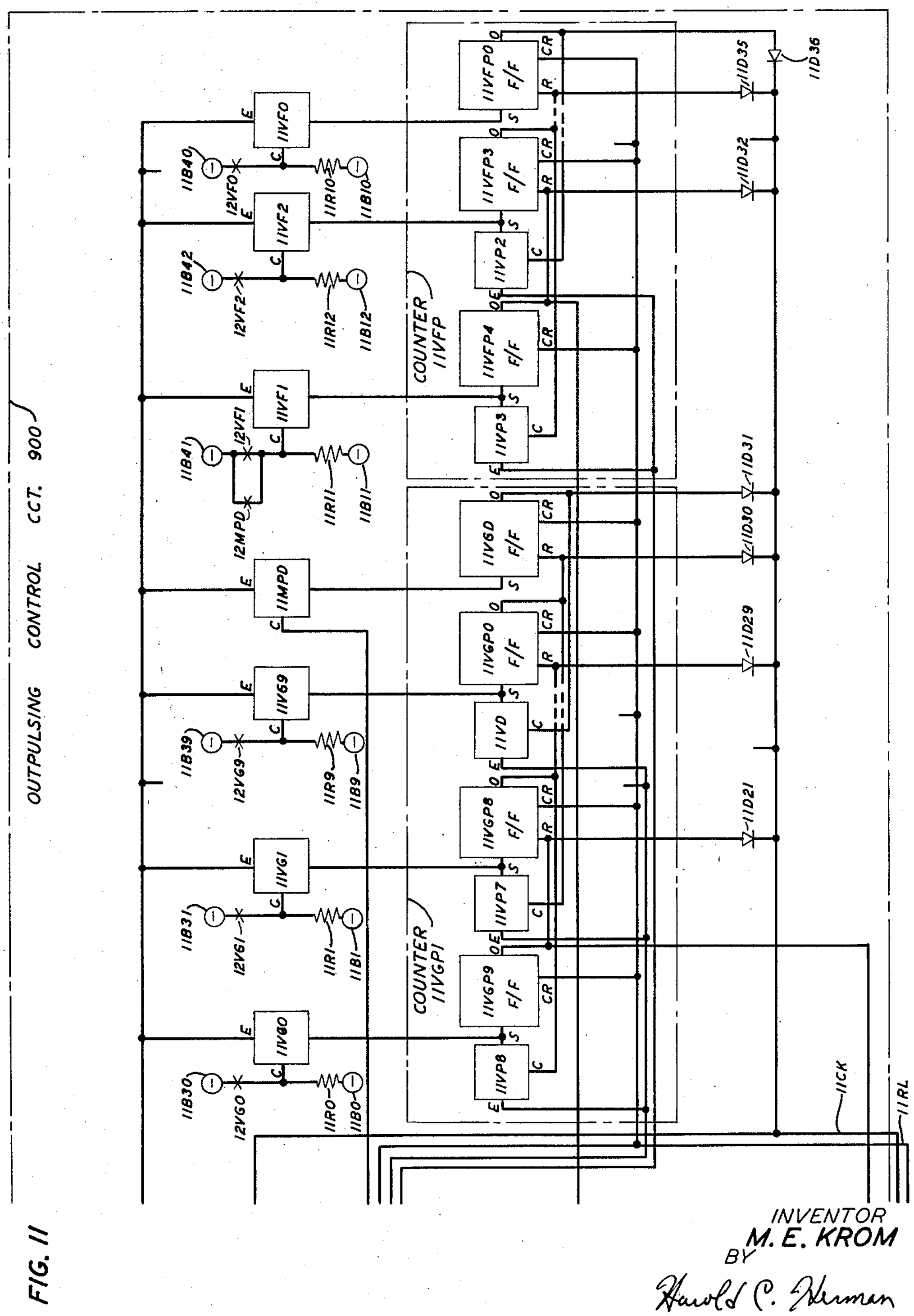
Figure 12:
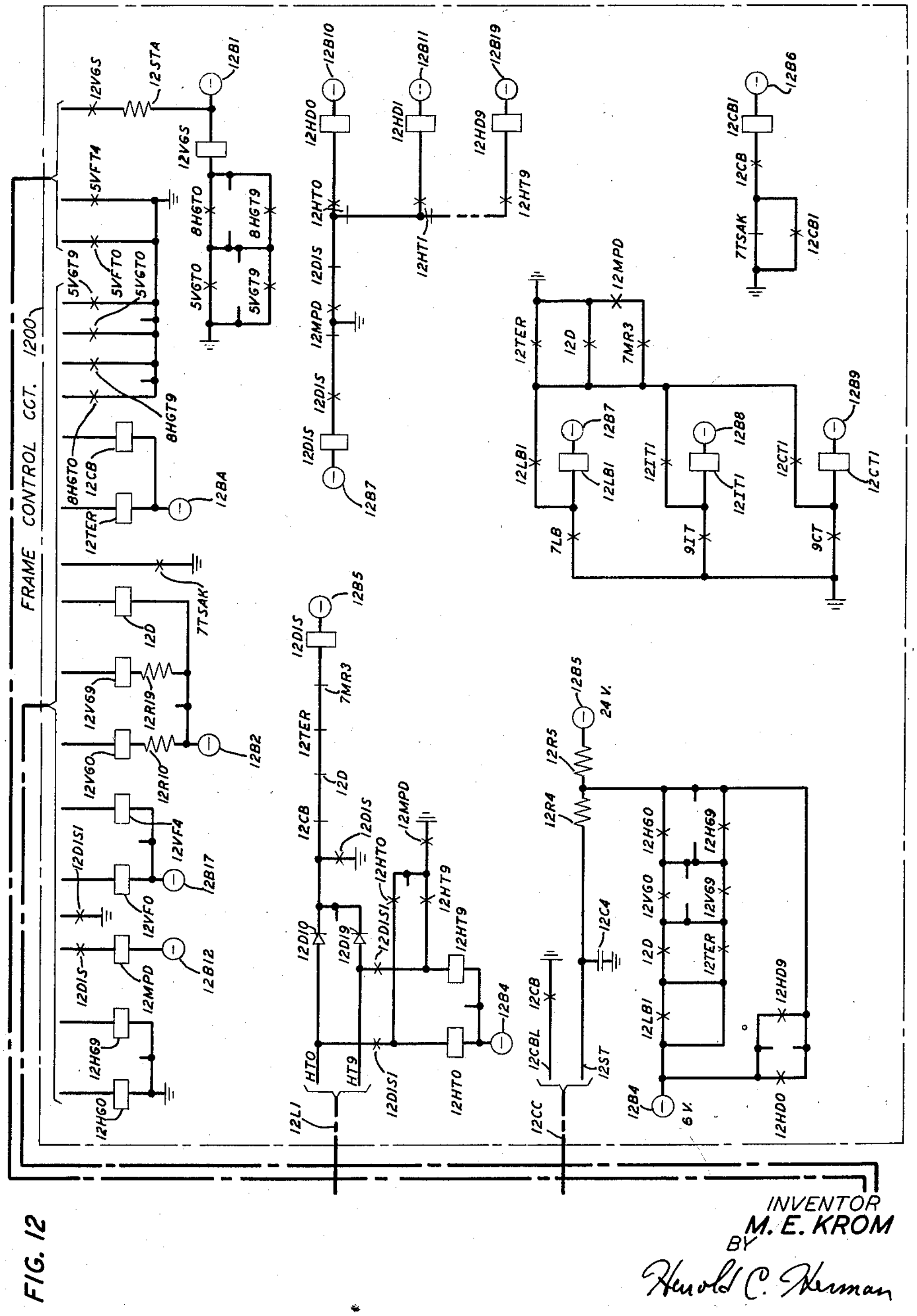

When the relay 5VGT0 operates, it operates a start relay 12VGS in the circuit 1200 over a path through an operated contact of relay 8HGT0 to a battery 12B1. When relay 12VGS operates, it closes a start path from the battery 12B1 through a resistor 12STA to a line link marker connector 1009 which seizes the marker 1008. The marker 1008, connectors 1009—10, etc. shown in Fig. 10 are of the type disclosed in the Patent 2,585,904 which issued on February 19, 1952 to A. J. Busch.

When the marker 1008 is seized, it seizes the dial-tone register 1004 through a connector 1005 in preparation for connecting it to the calling line 2L00 and it seizes the line link connector 1010 receiving the vertical group and horizontal group information therefrom. The vertical file information is thereafter received from the connector 1009. With the vertical group, vertical file and horizontal group information relating to the calling line 2L00 received at the marker 1008, the line link connector 1010 is controlled by the marker 1008 to operate the relays 12HG0, 12VF0 and 12VG0 in the frame control circuit 1200. In addition, a relay 12D is operated to indicate that the call is a dial tone or originating call. The relays 12HG0 and 12VF0 are operated over a path to ground and the relays 12VG0 and 12D are operated over a path to battery 12B2. The windings of the relays 21VG0–9 are serially connected respectively with resistors 12R10–19 between the battery 12B2 and the connector 1010.

When the frame control circuit 1200 is operated in this manner, it functions to initiate a trunk selection sequence in the trunk selector circuit 710 and to ready the central office and the line concentrator 200 for outpulsing the identity of the selected trunk and calling line identity.

The trunk selection sequence is initiated in the selector circuit 710 when the potential on a start lead 12ST changes from minus 24 volts towards minus 6 volts. Selector circuits of this type are disclosed in detail in the copending patent application Serial No. 678,134, filed on August 4, 1957, by B. W. Lee and in the copending patent application Serial No. 555,929, filed on December 26, 1955, by Brooks-Joel-Krom. The operation of relays 12D, 12VG0 and 12HG0 provides for the start potential on lead 12ST from the frame control circuit 1200. Normally the lead 12ST, which is connected to the grounded capacitor 12C4, is at a potential of minus 24 volts due to its connection through resistors 12R4 and 12R5 to battery 12B5. When relays 12HG0, 12VG0 and 12D operate, a path is provided from the junction of resistors 12R4 and 12R5 through the serially connected operated contacts of relays 12HG0, 12VG0 and 12D, and the normal contact of relay 12LB1 to a 6-volt battery 12B4. The start potential is provided in this manner through lead 12ST, which is part of cable 12CC, to the selector circuit 710 even if relay 12VF0 has not as yet operated.

In addition to the start potential on lead 12ST, the selector circuit 710 utilizes a timing pulse from the pulse generator 500 through lead 5TP0, and trunk availability information from the memory circuit 1100. Only six of the trunks 4T0–9 are available for connection to any one of the lines 2L00, etc. and a selection preference is established wherein trunks 4T8 and 4T9 are always the last two preferred trunks. Fig. 15 illustrates the trunks available for connection to each line and their selection preference. The leads C0–7 identify the trunk numbers and the leads T0–3 identify the preference. The six trunks connectable to a line are referred to as a trunk multiple and the multiples are the same for all five lines in each vertical group. In all there are ten different trunk multiples, one for each vertical group. A trunk multipling system of this type is disclosed in the above-identified disclosures by Brooks-Joel-Krom and Joel-Krom-Posin. The trunk availability information is provided to the circuit 710 from the memory circuit 700 which is described in detail in the above-identified disclosure by Abbott-Krom-Mehring-Whitney.

When a connection is established from a line through any one of the line concentrators 200–9, the memory circuit 700 registers the identity of the trunk utilized for the call and the vertical file and vertical group identities of the line. The selector circuit 710 utilizes the trunk availability information to select the first available preferred trunk. Suppose, for example, the first three preferred trunks 4T3–1 are busy but that trunk 4T0, the next preferred, is idle. With the first three preferred trunks for the vertical group 0 unavailable, the fourth preferred trunk 4T0, which is available, is selected and identified.

When the selection is completed a check relay 7TSAK is operated. When relay 7TSAK operates, it connects a control potential through lead 9TSK, which is part of cable 7CB, to enable a gate 9TSK2 in the outpulsing control circuit 900. As is hereinafter described, the gate 9TSK2, which is part of the vertical group outpulsing path, is normally inhibited due to the connection of its terminal C1 through a resistor 9R13 to a battery 9B9. When the ground potential is provided through lead 9TSK to the terminal C2 of the gate 9TSK2, the gate 9TSK2 becomes enabled. The gate 9TSK2 is a combined gate having its terminal C1 connectable through a contact of a preference relay 12MPD to a battery 9B8. If the battery 9B8 is connected to terminal C1, the ground potential at terminal C2 does not enable the gate 9TSK2. As is hereinafter described, relay 12MPD is operated during the disconnect sequence of operations to prevent enabling the gate 9TSK2.

When relay 9TSK2 is enabled, it readies a vertical group outpulsing path from the circuit 900 to the line concentrator 200. Before proceeding, however, with the outpulsing sequence, consider the situation in which all of the trunks connectable to line 2L00 are busy.

If no idle trunks are available for selection, the call is abandoned. The marker 1008 does not complete the connection to the originating register 1004 until a closure is provided from the connector 1010 through an operated contact of relay 7TSAK shown in Fig. 12. If all the concentrator trunks available to the particular vertical group requesting service are busy during the trunk selection sequence, the switch 1000 is operated by the circuit 710 to provide a busy indication through the connector 1010 to the marker 1008. The busy indication causes the marker 1008 to release and release the circuit 710.

More specifically, when the marker 1008 releases, it releases the connectors 1010 and 1009 and the register 1004. Thereupon relays 12D, 12HG0, 12VG0 and 12VF0 are released to initiate a release sequence for returning the central office to normal and restart normal scanning. The sequence for returning the central office equipment to normal when the marker 1008 releases is the same as that, hereinafter described, which takes place when the marker 1008 releases after establishing an originating connection.

Assuming that trunk 4T0 is selected for connection to the calling line 2L00, the marker 1008 maintains its control of the connector 1010. After the trunk 4T0 is selected, the selector circuit 710 functions to outpulse the identity of the selected trunk 4T0 to the line concentrator 200. The trunk outpulsing sequence is controlled by the outpulsing control circuit 900. The circuit 900 is operated to initiate the outpulsing sequence by the frame control circuit 1200 when relays 12D, 12VG0, 12VF0 and 12HG0 are operated.

When the frame control circuit 1200 is operated, it readies a path for operating a flip-flop circuit 8HGS in the concentrator control circuit 600 by enabling a gate circuit 8HG1. The control path for the gate 8HG1 is from ground through a normal contact of a relay 12CT1 and the serially connected operated contacts of relays 12D, 12VF0, 12VG0 and 12HG0 to the control terminal C of the gate 8HG1. The control terminal C of the gate 6HG1 is normally at a negative potential due to its connection through a resistor 8HG0 to a negative battery 8B2. When the gate 8HG1 is enabled, it readies a path from the timing pulse lead 5TP0 of the scanner pulse generator 500 through the gate 8HG1 to the input terminal S of the flip-flop circuit 8HGS. The next timing pulse through lead 5TP0 functions to set the circuit 8HGS.

When the flip-flop circuit 8HGS is set it performs the following functions:

(1) It inhibits the gates 8HGS1–3 to open the paths for the scanning pulses to the concentrator 200;

(2) It enables the gates 8HGS4–9 in preparation of outpulsing to the concentrator 200;

(3) It operates a flip-flop circuit 9STA in the control circuit 900 over a path from the output terminal B of the circuit 8HGS through lead 8HGL, which is part of cable 9CA, and the capacitor 9C7 to the input terminal S of the circuit 9STA; and (4) It enables a gate 9CKR1 by providing a control potential through lead 8HGL and a varistor 9D8 to its control terminal C.

When the flip-flop circuit 9STA in the control circuit 900 is set, it functions to ready a path for transmitting timing pulses from the lead 5TP0 of the generator 500 to a lead 9OP of the trunk selector circuit 710. The pulses to the lead 9OP of the selector circuit 710 are utilized during the trunk outpulsing sequence. The outpulsing control circuit 900 also commences vertical group outpulsing upon its operation by the circuit 8HGS in the control circuit 600. As is hereinafter described, the vertical group and trunk outpulsing are concurrent.

When the circuit 9STA is operated, it provides a control potential through a varistor 9D40 to a reset amplifier 9RS. The input terminal of the reset amplifier 9RS is connected through a resistor 9R32 to a negative battery 9B6. The amplifier 9RS functions to insure that the circuit 900 is normal or ready by providing a reset or normalizing pulse to the circuits 9VFLA, 9CTA, 9ITA and 9RIA and to counters 11VGP and 11VFP in the circuit 1400. The reset pulse is also provided through a lead 11RL to the memory circuit 700.

When the flip-flop circuit 9STA operates, it also provides a control potential to enable three gates 9ST1–3 and to disable a gate 9STA4. The next pulse through lead 5TP0 is provided respectively through the enabled gates 9ST3 and 9ST2 to the reset lead 8RSL and to the input terminal S of the flip-flop circuit 9RIA. The reset pulse is provided through lead 8RSL, the gate 8HGS4, the amplifier 6RS, transformer 6TR1 and the control pair 4CP1 to reset the counters 2VF and 2VG in the line concentrator 200. When the circuit 9RIA is set, it provides a control potential to the control terminal C of a gate 9RI1.

The next pulse through lead 5TP0 is gated through the enabled gates 9RI1 and 9ST1 to a read-in amplifier 9RA. The amplifier 9RA generates a pulse which resets the circuit 9STA and which sets two outpulsing counters 11VGP and 11VFP to register respectively the vertical group and vertical file digits to be outpulsed to the line concentrator 200. The same pulse through lead 5TP0 is also routed as a second reset pulse to the line concentrator 200 through the enabled gate 9ST3 as was the preceding reset pulse. In this manner, the next timing pulse after the circuit 9RIA is set performs two functions:

(1) It is sent to the line concentrator 200 to insure it is reset; and (2) It functions as a read-in pulse for the two counters 11VGP and 11VFP.

The counter 11VGP is an eleven-stage counter having stages 11VGP0–9 and 11VD, and counter 11VFP is a five-stage counter having stages 11VFP0–4. Each of the stages 11VGP0–9, 11VD and 11VFP0–4 is a bistable circuit. The read-in pulse from the amplifier 9RA is provided to the input terminals of ten enabling gates 11VG0–9, an enabling gate 11MPD and five enabling gates 11VF0–4. The setting of the counters 11VGP and 11VFP by the read-in pulse is controlled by the relays 12VG0–9 and 12VF0–4 in the control circuit 1200. With relays 12VG0 and 12VF0 operated to identify the calling line 2L00, the read-in pulse from the amplifier 9RA is supplied through the gate 11VG0 to the input terminal of the circuit 11VGP9 and it is also provided through the gate 11VF0 to the input terminal of the circuit 11VFP0. The control terminals C of the gates 11VG0–9 are connected respectively through operated contacts of the relays 12VG0–9 to batteries 11B30–9 and also through resistors 11R0–9 to batteries 11B0–9. The control terminals C of the gates 11VF0–4 are connected respectively through the operated contacts of the relays 12VF0–4 to batteries 11B40–44 and also through resistors 11R10–14 to batteries 11B10–14. The first pulse from the amplifier 9RA functions therefor to read-in the vertical file and vertical group information to the outpulsing counters 11VGP and 11VFP.

The next timing pulse through the lead 5TP0 is routed through the gates 9RI1, 9ST4 and 9LB1 to the outpulsing amplifier 9OP1 which performs the following functions:

(1) It sets the idle test flip-flop circuit 9ITA if a relay 7TM2 in the memory circuit 700 is operated;

(2) It applies to pulse through the lead 9OP whichi s part of cable 7CB to the selector circuit 710 where it is utilized during the trunk outpulsing sequence;

(3) It steps the vertical group outpulsing counter 11VGP; and (4) It supplies a vertical group pulse to the line concentrator 200.

The operating path for the flip-flop circuit 9ITA is from the outpulsing amplifier 9OP1 through the enabling gate 9TM2. The enabling gate 9TM2 is normally inhibited due to the connection of its terminal C through resistor 9R16 to the negative battery 9B11. The gate 9TM2 becomes enabled when a relay 7TM2 in the memory circuit 700 operates to connect the battery 9B12 to the control terminal C of the gate 9TM2. The relay 7TM2, which is a slow operating relay, is operated when relays 12D, 12HG0, 121VG0 and 12VF0 operate to time a line busy test in the memory circuit 700. If the line is idle, relay 7TM2 is operated. With relay 7TM2 operated so that the gate 9TM2 is enabled, the first pulse from the outpulsing amplifier 9OP1 sets the flip-flop circuit 9ITA. When the circuit 9ITA is set, it provides an enabling potential to a gate 9LB1 and it operates a relay 9IT, the winding of which is connected between the terminal B of the circuit 9ITA and the battery 9B20. The enabling potential is provided to the control terminal C1 of a gate 9LB1. The gate 9LB1 is a composite gate which is enabled by a control terminal C1 provided that a control potential does not exist at its control terminal C2. As is hereinafter described, the gate 9LB1 is inhibited by the memory circuit 700 when a terminating call is initiated to a busy concentrator line.

When the relay 9IT operates, it in turn operates a relay 12IT1 in the frame control circuit 1200 by completing a path from ground through an operated contact of relay 9IT and the winding of relay 12IT1 to a battery 12B8. When the relay 12IT1 operates, it locks to ground through its operated contact and an operated contact of relay 12D. As is hereinafter described, relay 12IT1 also operates the circuit 700 and readies a control path in the trunk switch 1000. As is also hereinafter described, the control path is utilized by the marker 1008 after the trunk switch 1000 has completed a connection from the selected trunk 4T0 to the originating register 1004.

As described above, the first pulse from the outpulsing amplifier 9OP1 is also provided to the counter 11VGP. The counter 11VGP functions to count up to the vertical group identity. The counter stages 11VGP0–9 are successively operated depending upon which one was set by the read-in pulse from the amplifier 9RA. As described above, with relay 12VG0 operated, the read-in pulse sets the last stage 11VGP9 of the counter 11VGP. When the stage 11VGP9 is set, it blocks the vertical group outpulsing. Since the stage 11VGP9 is set initially to register a vertical group number of 0, no vertical group pulses are supplied to the line concentrator 200. The output terminal 0 of the stage 11VGP9 is connected to the control terminal C of an inhibiting gate 11VG9 and to the control terminal C of an enabling gate 11VGP9. The gate 11VG9 is in the vertical group outpulsing path to the line concentrator 200. The vertical group outpulsing path is readied from the outpulsing amplifier 9OP1 through the gate 9TSK2, the gate 9VG9, an amplifier 9VGP, lead 8VGL, which is part of the cable 9CA, the enabled gate 8HGS5, the amplifier 6VG, resistor 6R2, the transformer 6TR1 and the control pair 4CP1 to the line concentrator 200. The amplifier 6VG triggers the amplifier 6RS to provide for a vertical group dipulse. For any other vertical group except 0 the counter 11VGP does not disable the gate 9VG9 initially so that vertical group pulses are provided to the concentrator 200. The stages 11VGP0–9 of the counter 11VGP are connected in a chain by the enabling gates 11VD and 11VP0–8. As each of the stages 11VGP0–8 is set, it enables the associated one of the gates 11VP0–8 so that the next pulse sets the adjacent stage. The stepping sequence always ends when the stage 11VGP9 is set because then the gates 11VD and 11VP0–8 are disabled.

The gate 9VGP9, which is enabled by the stage 11VGP9, is in the vertical file outpulsing path to the line concentrator 200. The vertical file pulses are not provided, however, to the line concentrator 200 until both vertical group outpulsing and trunk outpulsing are completed.

As described above, the trunk outpulsing is initiated when the pulses are provided from the outpulsing amplifier 9OP1 through lead 9OP, which is part of the cable 7CB, to the trunk selector circuit 710. The trunk selector circuit 710 includes stepping circuits, not shown, which function to provide a number of pulses to lead 9M to identify the selected trunk 4T0. One pulse is provided to identify trunk 4T0; two pulses are provided to identify trunk 4T1, etc. The lead 9M from the trunk selector circuit 710 is connected through the cable 7CB, varistor 9MG, an inhibiting gate 9CK2, an amplifier 9MP, lead 8ML, which is part of cable 9CA, the enabled gate 8HGS7, the amplifier 6M, resistor 6R4, the transformer 6TR2 and the control pair 4CP2 to the line concentrator 200. The amplifier 6M triggers the amplifier 6VF to provide for the dipulse. In this manner the vertical group pulses are provided through the control pair 4CP1 concurrent to the supply of the trunk identifying pulses through the control pair 4CP2.

When the outpulsing sequence is completed in the trunk selector circuit 710, a control potential is provided through lead 9OFL, which is part of the cable 7CB, to the control terminal C of an enabling gate 9OFL1. When the gate 9OFL1 is enabled, it completes the vertical file pulsing path from the outpulsing amplifier 9OP1 to the line concentrator 200. The vertical file pulsing path from the amplifier 9OP1 is through the enabled gates 9VGP9 and 9OFL1, an amplifier 9VFP1, an inhibiting gate 9VF5, an amplifier 9VFP2, lead 8VFL, which is part of cable 9CA, the enabled gate 8HGS6, the amplifier 6VF, the transformer 6TR2 and the control pair 4CP2 to the line concentrator 200. The amplifier 6VF triggers the amplifier 6M to provide for the dipulse.

As described above, when the vertical file identity is read into the counter 11VFP, the stage 11VFP0 is set. With both vertical group pulsing and trunk pulsing completed, the pulse from the outpulsing amplifier 9OP1, that is supplied as a vertical file pulse to the line concentrator 200, is also supplied to the vertical file counter 11VFP. More specifically, the pulse from the amplifier 9OP1 is provided through the enabled gates 11VGP9 and 11OFL1 and the amplifier 9VFP1 to the enabling gates 11VFP0–3 of the counter 11VFP. With stage 11VFP0 set, only the gate 11VFP0 is enabled. The gate 11VFP0 is in the operating path for the stage 11VFP1 so that it is set by the first pulse from the amplifier 9OP1. This operation is repeated on each succeeding pulse until the stage 11VFP4 is set. With the stage 11VFP0 being initially set, four vertical file pulses are provided to the counter 11VFP before the stage 11VFP4 is set. These pulses are also supplied through the control circuit 600 to the line concentrator 200. When the stage 11VFP4 is set, it enables a gate 9VF4 and it disables the gate 9VF5 in the vertical file outpulsing path. In this manner, when the stage 11VFP4 is set, it blocks the vertical file pulsing to the line concentrator 200. Actually, except for vertical file 0, the counter 11VFP allows a number of vertical file pulses to be transmitted to the concentrator 200, which is one less than the vertical file identity. For example, if the vertical file identity is 4, three vertical file pulses are provided. When the vertical file identity is 0, four vertical file pulses are provided under control of the counter 11VFP.

The next timing pulse from the amplifier 9OP1 is provided through the enabled gates 9VGP9 and 9OFL1, the amplifier 9VFP1 and the now enabled gate 9VF4 to the input terminal S of a flip-flop circuit 9VFLA. When the circuit 9VFLA operates, it provides another vertical file pulse to the line concentrator 200. The additional vertical file pulse is provided from the output terminal 0 of the circuit 9VFLA through the inhibiting gate 9MPD1, a capacitor 9C9 to the vertical file outpulsing amplifier 9VFP2. The final pulse, therefore, identifying the vertical file is supplied from the circuit 9VFLA instead of from the counter 11VFP. For a vertical file identity of 0 a total of five pulses is provided to the line concentrator 200. The reason for supplying five pulses instead of none to indicate a vertical file of 0 is because at least one vertical file pulse is required. As is hereinafter described, the first vertical file pulse, in addition to being part of the file identification signal, also sets the concentrator for receiving mark pulses.

In this manner, the vertical group and trunk identities are first pulsed to the line concentrator 200 and thereafter the vertical file identity is pulsed thereto. During the outpulsing sequence the memory circuit 700 is operated to register the outpulsed identity. As is hereinafter described, when the memory sequence is completed, a gate 9MCK1 in the control circuit 900 is enabled to ready a path for operating a flip-flop circuit 9MA which initiates a mark pulse sequence for closing the crosspoints between the line 2L00 and the trunk 4T0.

At the concentrator 200 the outpulsed information is registered by the counters 2VF, 2VG and 3TK. The vertical group counter 2VG remains set at its stage 0 because no vertical group pulses are provided from the central office to identify the vertical group 0 of the calling line 2L00. Five vertical file pulses are provided through the control pair 4CP2 and the amplifier 4VFR to the input terminal S of the ring counter 2VF. The ring counter 2VF is, in this manner, operated or stepped through one cycle to return it to stage 0. The single trunk pulse identifying trunk 4T0 is provided through the control pair 4CP2, the amplifier 4MPR, the inhibiting gate 2TKB1, the amplifier 2TK to the trunk counter 3TK. The trunk counter 3TK has a number of stages, not shown, which are all normally in their reset condition. The first trunk pulse provides for an output potential at the output terminal 0. The output potential is provided to the control terminal C of a gate 3TCG to ready a path for the flip-flop circuit 3TKB.

The trunk counter 3TK is generally similar to the counters 2VF and 2VG except for the fact that normally all its stages are reset. These stages are reset to eliminate a current drain required to maintain a stage in the on condition. Since the trunk counter 3TK is not utilized during the normal scanning sequence, it is maintained in a reset condition until operated by the first trunk pulse from the central office during the sequence for establishing a connection to one of the lines 2L00, etc.

As described above, the vertical group outpulsing sequence and the trunk outpulsing sequence are concurrent with the vertical file outpulsing sequence following. The first vertical file pulse in addition to operating the ring counter 2VF is also provided from the amplifier 4VFR through the enabled gate 3TCG to the input terminal S of the flip-flop circuit 3TKB. When the circuit 3TKB is set, it provides a control potential through varistor 3V4 to the control terminal C of the inhibiting gate 2TKB1 to block pulses to the trunk counter 3TK. When the circuit 3TKB is set, it also enables a gate 3TKB2 so that succeeding pulses from the amplifier 4MPR will operate the flip-flop circuit 3MA. The vertical file pulses, in this manner, signal the concentrator 200 that the trunk outpulsing is completed as well as transmitting the vertical file identity. It is because of this double function that five vertical file pulses are transmitted to identify a vertical file of 0. The counter 2VF is set at its stage 0 by the reset pulses from the central office and the five identifying pulses operate it through one cycle to return to stage 0. At least one vertical file pulse is always transmitted to set the concentrator for receiving mark pulses. The trunk and mark pulses are of the same polarity and over the same control pair 4CP2 and the vertical file pulse sets the concentrator to utilize subsequent pulses as mark pulses. The mark pulses are not supplied from the central office until after the completion of the vertical file outpulsing sequence and also not until the completion of the registration of the line and trunk identities in the memory circuit 700.

The memory circuit 700 is operated when the marker 1008 obtains access to the frame control circuit 1200 and operates the relays 12HG0, 12VF0 and 12VG0. In other words, at the same time that the trunk selection sequence is initiated, the memory circuit 700 is readied for registering the line and selected trunk identities. When the trunk selector circuit 710 is operated to select trunk 4T0 for the originating connection, the memory circuit 700 is enabled to register a record of the connection to be established.

With the memory circuit 700 readied, when the relays 9IT in the outpulsing control circuit 900 and the relay 12IT1 in the circuit 1200 operate, the memory circuit 700 completes its registration sequence recording the line and selected trunk identities. As described above, the relay 9IT is operated in the circuit 900 when the trunk outpulsing and vertical group outpulsing sequences are initiated to operate the relay 12IT1.

When the memory registration is complete, a relay 7LB and a memory check relay 7MCK, which indicates the successful storage of the line and trunk information are operated.

When the relay 7LB is operated, an inhibiting potential is provided to the gate 9LB1 in the outpulsing control circuit 900 to open or block the outpulsing path from the circuit 900. When the relay 7LB operates, it also in turn operates a relay 12LB1 in the frame control circuit 1200. The operating path for the relay 12LB1 is from ground through an operated contact of relay 7LB and the winding of relay 12LB1 to battery 12B7. When the relay 12LB1 operates, it locks to ground through its operated contact and an operated contact of the relay 12D. When relay 12LB1 operates, it functions to enable the trunk switch 1000 by readying an operating path, not shown, for the hold magnet associated with trunk 4T0.

When the relay 7MCK operates, it enables a gate 9MCK1 in the control circuit 900 to initiate the mark outpulsing for closing the concentrator crosspoints. The control terminal C of the gate 9MCK1 is normally at a negative potential due to its connection through a resistor 9R14 to a battery 9B14. When the relay 7MCK operates, it provides a connection from the control terminal C of the gate 9MCK1 through a varistor 9D38 and an operated contact of relay 7MCK to ground. The varistor 9D38 is connected to a battery 9B15 through a resistor 9R15. When the gate 9MCK1 is enabled, it readies a path from the outpulsing amplifier 9OP1 to the input terminal S of a flip-flop circuit 9MA. The set path for the circuit 9MA is through the enabled gate 9MCK1 and the enabled gate 9VFL1. The next timing pulse provided through the amplifier 9OP1 sets the mark flip-flop circuit 9MA which operates an associated relay 9M and which enables two gates 9M1 and 9M2. Relay 9M is operated as its winding is connected between the output terminal B of the circuit 9MA and a battery 9B24. The output terminal 0 of the circuit 9MA is connected to the control terminals C of the gates 9M1 and 9M2. The succeeding timing pulses are supplied from the outpulsing amplifier 9OP1 through the now enabled gate 9M1, the inhibiting gate 9CK2, the amplifier 9MP, lead 8ML, which is part of cable 9CA, the gate 8HGS7, amplifier 6M and the control pair 4CP2 to the line concentrator 200. In the line concentrator 200 the mark pulses function to establish a connection from the calling line 2L00 to the selected trunk 4T0. As is hereinafter described, the mark pulses are supplied to the concentrator 200 until a crosspoint closure indication is received at the control circuit 900 from the concentrator 200.

In the concentrator 200 the mark pulses are provided through the amplifier 4MPR, the enabled gate 3TKB2 to the input terminal S of the flip-flop circuit 3MA. The circuit 3MA is set by the first mark pulse applied at its input terminal S. When the circuit 3MA is set, it operates a relay 3M, the winding of which is connected between the output terminal B of the circuit 3MA and through a resistor 3R1 shunted by a capacitor 3C1 to a battery 3B5. An output potential is also provided from the output terminal 0 of the circuit 3MA to an amplifier 3DR which provides a reset potential to the flip-flop circuit 3DA. Only one of the circuits 3DA and 3MA is set at any time. When either sets, to insure that the other is reset, it provides a reset potential thereto. When the relay 3M operates, it in turn causes the operation of a relay 3M1. The operating path for relay 3M1 is from ground through an operated contact of relay 3M and the winding of relay 3M1 to battery 3B6. When relay 3M operates, it also connects the minus 24-volt source 2B1 through a resistor 3TKL to the windings of the ten trunk register relays 3TKR0–9. When relay 3M1 operates, it connects the battery 2B1 respectively through resistors 2RF and 2RV to the windings of the register relays 2VFR0–4 and 2VGR0–9.

With the counters 2VF, 2VG and 3TK set to identify line 2L00 and trunk 4T0, the relays 2VFR0, 2VGR0 and 3TKR0 are operated. When the relays 3TKR0, 2VFR0 and 2VGR0 operate, they in turn operate similarly numbered relays 3TKA0, 3F0 and 3G0. The operating path for relay 3TKA0 is from ground through an operated contact of relay 3TKR0 and the winding of relay 3TKA0 to battery 3B9. The operating path for the relay 3G0 is from ground through an operated contact of relay 2VGR0 and the winding of relay 3G0 to battery 3B8. A similar operating path is provided for the relay 3F0 through an operated contact of relay 2VFR0. When the relays 3F0 and 3G0 are operated, operating paths are completed for the crosspoint relays 3TG00 and 3TF00 and for releasing the relays 3C00 and 3CK1. The operating path for the relay 3TG00 is from ground through an operated contact of relay 3M1, the winding of relay 3TG00, an operated contact of relay 3G0, an operated contact of relay 3TKA0 and an operated contact of relay 3M1 to the battery 3B7. A similar operating path is provided for the relay 3TF00 through an operated contact of relay 3F0 and for the serially connected relays 3CK1 and 3C00 through an operated contact of relay 3F0 and an operated contact of relay 3G0.

The relays 3TF00, 3TG00 and 3C00 are magnetically latched relays of the type disclosed in the above-identified disclosure by G. E. Perreault. The relays require a definite release potential as they remain operated in the absence of applied potential. Even in the absence of operating current, a current of reverse polarity to the operating current is required to release relays 3TF00, 3TG00 and 3C00. The relay 3C00 is normally operated being also of the latching type and, as is hereinafter described, is operated at the same time that the relays 3TF00 and 3TG00 are released. When the relay 3C00 releases, it disconnects the transistor scanning unit 2LSG0 from the line 2L00 so that line 2L00 is not scanned as long as the relay 3C00 is released and a clear tip and ring from the station 2S00 can be provided to the central office. Relay 3CK1 operates at the same time that the relay 3C00 releases.

When the relays 3TF00, 3TG00 and 3CK1 operate, a control path is completed for enabling a gate 3CT1. The control terminal C of the gate 3CT1 is normally at a relatively negative potential due to its connection through resistor 3T5 to battery 3B10. At the same time that a connection is established from line 2L00 to trunk 4T0 through contacts of relays 3TF00 and 3TG00, a control path is completed from battery 3B11 through an operated contact of relay 3M1, an operated contact of relay 3CK1, an operated contact of relay 3TKA0, an operated contact of relay 3TF00, an operated contact of 3TG00, an operated contact of relay 3TKA0 to the control terminal C of the gate 3CT1. The next mark pulse from the amplifier 4MPR is provided through the gate 3CT1, the amplifier 4CTT, the transformer 4TR1 and the control pair 4CP1 to the central office. The amplifier 4CTT triggers the amplifier 4SRT to provide for the dipulse. In the central office this connect check pulse functions to block the mark pulses to the concentrator 200. This signal, in combination with an indication, hereinafter described, that the marker 1008 has applied ground to operate the trunk switch 1000, causes the control circuit 900 to initiate a reset sequence returning the central office and the concentrator 200 to normal.

The connect check pulse from the concentrator 200 is supplied through the transformer 6TR1, the amplifier 6CT, the enabled gate 8HGS8, lead 8CTL, which is part of cable 9CA, and the enabled gate 9M2 to set the flip-flop circuit 9CTA. When the circuit 9CTA is set, it operates the associated relay 9CT, the winding of which is connected between terminal B of the circuit 9CTA and a battery 9B25. When the relay 9CT operates, it in turn causes the operation of a relay 12CT1 in the frame control circuit 1200. The operating path for the relay 12CT1 is from ground through an operated contact of relay 9CT and the winding of relay 12CT1 to a battery 12B9. When the relay 12CT1 operates, it locks to ground through its operated contact and an operated contact of relay 12D.

When the circuit 9CTA is set, it also provides an inhibiting potential from its output terminal 0 to the control terminal C of the inhibiting gate 9CK2 to block the mark pulses to the concentrator 200. A control potential is also provided from the output terminal 0 of circuit 9CTA to the control terminal C of an enabling gate 9CT1. When the gate 9CT1 is enabled, succeeding timing pulses through lead 5TP0 from the pulse generator 500 are provided through lead 8RSL, which is part of cable 9CA, the enabled gate 8HGS4, the reset amplifier 6RS and transformer 6TR1 to the line concentrator 200. The reset pulses function to reset the line concentrator 200 to normal. In the line concentrator 200 the reset pulses are provided through the transformer 4TR1 and the amplifier 4RSR to reset the counters 2VF, 2VG and 3TK and to reset the circuits 3MA and 3TKB. The reset paths for these components are described above during the normal scanning sequence.

During the time that the connection is being established in the concentrator 200 a connection is also being established in the trunk switch 1000 to the other end of the selected trunk 4T0. When the marker seizes the frame control circuit 1200 and operates the relay 12HG0, it tests the sleeve leads of the horizontals of the crossbar switches in the trunk switch 1000. The trunk switch 1000 includes ten trunk crossbar switches associated with concentrators 200–9 and ten junctor switches connected in a conventional crossbar system of the type described in the above-identified Busch patent.

The marker 1008 selects an idle channel to the crossbar switch associated with the line concentrator 200. When the marker 1008 selects a channel it provides an operating potential through the line link connector 1010 to the switch 1000 individually associated with the vertical file identities 0–4. The operating path is through an operated contact, not shown, of relay 12IT1, and an operating contact, also not shown, of relay 12LB1. The relay 12LB1 is operated, as described above, after the line and trunk information has been registered in the memory circuit 700 and serves to prevent completing a call in the event the line and trunk information is not stored in the memory circuit 700. Failure to operate the relay 12LB1 causes the marker 1008 to time-out and take a trouble record.

When a connection is established through the switch 1000 a relay 10HM is operated. When the relay 10HM operates, it functions to inhibit the gate 8HG1 in the concentrator control circuit 600 and to enable a gate 9HGR in the outpulsing control circuit 900. The gate 8HG1 is an enabling gate and a control potential was provided thereto from ground through a normal contact of the relay 10HM and the serially connected operated contacts of relays 12D, 12VF0, 12VG0 and 12HG0. When the relay 10HM operates, it opens this control path allowing the gate 8HG1 to return to its normal inhibited condition. As described above, the gate 8HG1 is part of a set path for the flip-flop circuit 8HGS. With the gate 8HG1 inhibited the flip-flop circuit 8HGS can be reset.

The gate 9HGR is normally inhibited due to the connection of its control terminal C through a resistor 9R6 to a battery 9B18. When the relay 10HM is normal, a control path is provided from ground in Fig. 8 through a normal contact of the magnet 10HM, an operated contact of the relay 12D, a varistor 8V2 and lead 8GRL, which is part of cable 9CA, to the control terminal C of the gate 9HGR. When the relay 10HM operates, it opens this control path allowing the gate 9HGR to return to its normal enabled condition. The gate 9HGR is part of a release path from lead 5TP3 of the pulse generator 500 to the release amplifier 9RLS which functions to return the central office equipment to normal. The release path to the amplifier 9RLS is from lead 5TP3 through the enabled gates 9HGR and 9CKR1. The control terminal C of the enabling gate 9CKR1 is connected to the output terminals 0 of the flip-flop circuits 9STA, 9RIA, 9VFLA, 9MA, 9CTA and 9ITA in the control circuit 1400, to the output terminals 0 of the stages 11VGP0–9, 11VGD and 11VFP0–3 respectively through varistors 11D30–21, 11D31 and 11D35–32 and to the memory circuit 700 through lead 11CK. As long as any of these flip-flop circuits remain set, the gate 9CKR1 remains enabled.

The amplifier 9RLS provides a reset pulse through lead 8RL, which is part of the cable 9CA, and a varistor 8SD0 to the input terminal S of the flip-flop circuit 8SD in the concentrator control circuit 600. The circuit 8SD provides a reset pulse through the amplifier 8RSC to the reset terminal R of the circuit 8HGT causing it to reset. The circuit 8SD is itself reset by the next timing pulse through lead 5SDR of the control pulse generator 500.

The release amplifier 9RLS also provides a reset pulse through lead 5RLS, which is part of cable 7CA, to the register circuit 510 causing it to return to normal. The release amplifier 9RLS also provides a reset pulse through the amplifier 9HGSR, lead 8HGSR, which is part of cable 9CA, to the reset terminal R of the flip-flop circuit 8HGS causing it to reset. The circuit 8HGS remains reset because its operating path through lead 5TP0 is opened, as described above, at the gate 8HG1. When the flip-flop circuit 8HGS is reset, it returns the gates 8HGS1–8 to normal to close the outpulsing paths and to open the scanning paths to the line concentrator 200. A similar operation takes place in the concentrator control circuits 601–9 to prepare them for the normal scanning sequence.

The release amplifier 9RLS also provides reset pulses through the varistor 98, lead 8RSL, which is part of cable 9CA, the gate 8HGS4, which has not as yet been returned to normal, to the amplifier 6RS. Reset pulses are provided through amplifier 6RS to the concentrator 200 as long as the circuit 8HGS remains set to insure that it has been returned to its normal condition. The reset path through the gates 9HGR and 9CKR1 to the amplifier 9RLS remains open so that reset pulses are provided from the amplifier 9RLS as long as the central office equipment has not been returned to normal. The normal scanning paths are completed when the flip-flop circuits 8HGS and 8HGT are reset. The normal scanning paths from the pulse generator 500 are as described above during the normal scanning sequence through the leads 5VFL, 5VGL and 5RSL which are all part of a cable 5CA to the concentrator control circuits 600–9. In the concentrator control circuit 600 the lead 5VFL provides the vertical file pulses through the gate 8HGS3, the lead 5VGL provides the vertical group pulses through the gates 8HGT3 and 8HGS2 and the lead 5RSL provides the reset pulses through the gates 8HG2 and 8HGS1. Though scanning is resumed when the circuit 8HGS is reset, service requests are not recognized as the gates 8RHT1 in circuits 600–9 remain inhibited.

The release amplifier 9RLS also provides a reset pulse through a varistor 9D39 to the reset amplifier 9RS. The reset amplifier 9RS provides a reset pulse to the flip-flop circuits 9RIA, 9VFLA, 9MA, 9CTA and 9ITA returning them to normal. When these circuits are reset they release respectively their associated relays 9M, 9CT and 9IT. A reset pulse is also provided from the amplifier 9RS to the counters 11VGP and 11VFP resetting the stages 11VGP9 and 11VFP4 therein and through lead 11RL to the memory circuit 1100 which releases relays 7LB and 7MCK. The relays 12CT1, 12LB1 and 12IT1 in the frame control circuit 1200 remain locked operated until the marker 1008 releases.

A reset pulse is also provided from the release amplifier 9RLS through lead 9RLA, which is part of cable 7CB, to the trunk selector circuit 710. The release pulse through the lead 9RLA functions to partially return the circuit 710 to normal. An additional sequence takes place in the selector circuit 710 to complete the normalizing process when the connection through lead 12ST to battery 12B4 in the frame control circuit 1200 is open. This sequence takes place, as is hereinafter described, when the marker 1008 releases.

When the flip-flop circuit 8HGT in the concentrator control circuit 600 resets, it in turn releases the relay 8HGT0 associated therewith. When the relay 8HGT0 releases, it in turn releases the relay 12VGS in the frame control circuit 1200 and the relays 5VFT0 and 5VGT0 in the register circuit 710. When the relay 12VGS releases, it opens the start path through its operated contact from battery 12B1 to the line link marker connector 1009.

The marker 1008 initiates a release sequence after it has operated the trunk switch 1000. When the marker 1008 releases, it releases the connectors 1009 and 1010 which in turn release the frame control circuit 1200. In the frame control circuit 1200 the relays 12VF0, 12VG0, 12HG0 and 12D release. When the relay 12HG0 releases, it in turn releases the hold magnet 10HM in the switch 1000. Finally, when the relay 12D in the frame control circuit 1200 releases, it opens the locking paths for the relays 12CT1, 12LB1 and 12IT1 allowing them to release. Relay 12D also opens the start path to the trunk selector circuit 710 from the battery 12B4 allowing it to complete its normalizing operation. When the trunk selector 710 is returned to normal, the relay 7TSAK releases. In this manner the line concentrators 200–9 and the central office equipment are returned to normal with normal scanning resumed. The changes due to the initiation of the service request are the established originating connection through the trunk 4T0, and the registration in the memory circuit 700 of the line and trunk identities of the established connection.

*Terminating call*

The sequence of operations for establishing a terminating connection responsive to a call to one of the subscriber lines 2L00, etc. is substantially the same as the sequence of operations, described above, for an originating call. The two main exceptions in the sequence involve making a line busy test and providing a trunk overflow indication in the event all trunks are busy.

The terminating call is initiated when the marker 1008 seizes the frame control circuit 1200 through the line link connector 1010. If the call, for example, is to line 2L00 connected to the concentrator 200, the relays 12HG0, 12VF0, 12VG0 and 12TER are operated. The operating path for relay 12HG0 is to ground and the operating paths for relays 12VF0, 12VG0 and 12TER are respectively to the batteries 12B17, 12B2 and 12BA.

When the relays in the circuit 1200 operate, they enable the gate 8HG1 to ready a path for setting the flip-flop circuit 8HGS. The control path to the terminal C of the gate 8HG1 is from ground through a normal contact of relay 12CT1, an operated contact of relay 12TER, an operated contact of relay 12VF0, an operated contact of relay 12VG0 and an operated contact of relay 12HG0. With hte gate 8HG1 enabled, the next pulse on lead 5TP0 sets the circuit 8HGS. When the circuit 8HGS is set, it halts the line scanning and readies the central office for outpulsing the line and trunk identities in exactly the same way as for an originating call. The circuit 9STA is set by a pulse through lead 8HGL to start the control circuit 900, the circuit 9RIA reads in the line information to the counters 11VGP and 11VFP, etc. If the line 2L00 is idle, the sequence continues with the idle test circuit 9ITA setting to enable the gate 9LB1 in the outpulsing path.

The relay 7TM2 in the memory circuit 1100 is utilized for timing a line busy test which is made when the frame control circuit 1200 is seized. If the gate 9LB1 is not inhibited before the relay 7TM2 is operated, the flip-flop circuit 9ITA operates as an indication that the called line 2L00 is idle. A start potential is provided to the selector circuit 710 from battery 12B4 in the circuit 1200 through an operated contact of relay 12TER and the lead 12ST. The selected trunk and vertical group identities and then the vertical file identity are outpulsed to the concentrator 200 in exactly the same manner as described above for an originating call. Thereafter, mark pulses close the concentrator crosspoints from the called line 2L00 to the selected trunk. A crosspoint closure check is returned to set the circuit 9CTA which resets the central office and the line concentrators 200–9.

If, however, the called line 2L00 is busy, the gate 9LB2 in the outpulsing path is disabled during a line busy check of the memory circuit 700. When the line 2L00 is busy, relay 7LB is operated and the gate 9LB2 is inhibited to open the outpulsing path from the circuit 900. When the relay 7LB operates, it in turn operates a relay 12LB1 in the frame control circuit 1200. The operating path for the relay 12LB1 is from ground through an operated contact of relay 7LB and the winding of relay 12LB1 to battery 12B7. When the relay 12LB1 operates, it locks to ground through its operated contact and an operated contact of the relay 12TER. When relay 12LB1 operates, it supplies the line busy indication from the switch 1000, to the line link connector 1010. When the marker 1008 receives the line busy signal, it releases the frame control circuit 1200 and returns busy tone to the calling subscriber.

In the circuit 1200, relays 12VF0, 12VG0, 12HG0 and 12TER release and they release the circuit 700. Relay 12TER also releases relay 12LB1 and it opens the control path from ground in Fig. 8 through lead 8GRL to the control terminal C of the inhibiting gate 9CKR1. The gate 9CKR1 is part of a reset path from the lead 5TP3 through the gates 9HGR and 9CKR1 to the amplifier 9RLS. The amplifier 9RLS provides reset pulses to all the flip-flop circuits in the circuit 900 and also to the circuit 700. The gate 9CKR1 remains enabled as long as any of the flip-flop circuits in the control circuit 900 are set. When the circuit 700 is reset, it releases the relay 7LB. The line concentrator system is, in this manner, returned to normal if the called line 2L00 is busy.

When all trunks in the trunk multiple connected to the called line 2L00 are busy, the switch 1000 provides an indication thereof to the line link connector 1010. When the marker 1008 determines that all trunks are busy, it returns overflow tone to the calling subscriber and releases the frame 1200 returning the line concentrator system to normal.

*Callback*

When the originating connection is established from the line 2L00 to the register 1004, the subscriber at the station 2S00 dials the called subscriber. After the subscriber at the substation 2S00 has finished dialing, the marker 1008 is seized by the originating register 1004 to initiate a callback sequence of operations for establishing a connection from the selected trunk 4T0 to an outgoing trunk 1003 to the called subscriber. The normal scanning sequence is not interrupted during the callback sequence and the connection remains established at the concentrator 200 from the line 2L00 to the trunk 4T0. It is necessary, therefore, that the same trunk 4T0 be utilized for the talking connection to the outgoing trunk 1003 as was utilized for the originating call. In order to establish the outgoing connection to trunk 4T0, it is necessary to identify the trunk utilized on the dial-tone connection at the central office.

The marker 1008 seizes the line link connector 1010 and operates the frame control circuit 1200 supplying to it the line and concentrator identifying information and also an indication that the call is for a callback. With the call from line 2L00 of concentrator 200, the relays 12HG0, 12VG0, 12VF0 and 12CB are operated. The winding of the relay 12CB, which indicates that the call is for callback, is connected to the battery 12BA. When the relays 12HG0, 12VG0 and 12VF0 are operated, they function to operate the memory circuit 700 to determine the identity of the trunk utilized for the originating connection. When the relay 12CB operates, it connects ground in the frame control circuit 1200 as a start signal through lead 12CBL, which is part of cable 12CC, to the trunk selector circuit 710 which functions to register the identity of the busy trunk determined by the memory circuit 700.

When relay 12CB operates, it also functions to operate a relay 12CB1. The operating path for relay 12CB1 is from ground through a normal contact of relay 7TSAK, an operated contact of relay 12CB and a winding of relay 12CB1 to the battery 12B6. When the relay 12CB1 operates, it locks to ground through its operated contact and the contact of relay 12CB. The marker 1008 selects a channel from an outgoing trunk 1003 through the trunk link frame 1001 to the trunk switch 1000. The trunk identity is supplied to the switch 1000 from the selector circuit 710. The marker 1008 operates the switch 1000 to complete the path from the trunk 4T0 to the outgoing trunk 1003.

After the marker 1008 operates the switch 1000, it releases and in turn releases the frame control circuit 1200. In the circuit 1200, the relays 12HG0, 12VF0, 12VG0 and 12CB release. When the relay 12CB releases, it in turn releases the relay 12CB1 and it opens the operating ground in the circuit 1200 from the lead 7CB to the selector circuit 710 returning it to normal. When relays 12VG0, 12VF0 and 12HG0 release, they return the memory circuit 700 to normal.

After the switch 1000 is operated, an operating ground is provided on the sleeve lead from the trunk link 1001 which maintains the switch 1000 operated. The outpulsing circuit 900 is not operated during the callback sequence as the identity of the trunk utilized for the originating call is determined at the memory circuit 700. Moreover, as described above, line scanning is not halted by the callback call.

*Disconnect*

When the calling and called subscribers hang up, a disconnect sequence is initiated for disconnecting the trunk 4T0 from the calling line 2L00 and from the outgoing trunk 1003. A disconnect request is initiated when the trunk hold magnet in the trunk switch 1000 releases. As described above, the switch 1000 is held operated over the sleeve lead from the trunk link frame 1001. When the switch 1000 releases the connection between the trunk 4T0 and the frame 1001, it provides an indication of the release to the memory circuit 700. The circuit 700 operates a disconnect relay 12DIS in the frame control circuit 1200. The operating path for the relay 12DIS is from ground, in circuit 700, through the lead HT0, which is part of cable 12L1, a varistor 12D10, serially connected normal contacts of relays 12CB, 12D, 12TER and 7MR3 and the winding of relay 12DIS to the battery 12B5. If the central office equipment is handling a call when the disconnect is initiated, one of the relays 12CB, 12D, 12TER and 7MR3 is operated to delay the operation of relay 12DIS. The horizontal test leads HT0–9, which are part of the cable 12L1, correspond in number to that of the horizontal group or concentrator in which the disconnect occurs. For example, grounding the lead HT0 indicates that the disconnect request is for the concentrator 200.

When the relay 12DIS operates, it in turn operates the relay 12DIS1 over a path from ground through a normal contact of a preference relay 12MPD, an operated contact of the relay 12DIS and the winding of the relay 12DIS1 to the battery 12B7. When the relay 12DIS operates, it also provides an indication from ground in Fig. 12 through the line link connector 1010 to the marker 1008 that a disconnect sequence has initiated. Relay 12DIS1 operates the relay 12HGT0 over a path from the grounded lead HT0 through an operated contact of relay 12DIS1 and the winding of relay 12HT0 to a battery 12B4. The relays 12HT0–9 function to identify the horizontal group from which the disconenct request initiated. When the marker 1008 receives the disconnect indication through the connector 1010, it functions to operate a preference relay 12MPD over a path to battery 12B12. As is hereinafter described, when the relay 12MPD operates, it functions to block the initiation of originating or terminating calls and to give preference to the disconnect sequence.

When the relay 12MPD operates, it provides a locking path from ground through an operated contact of relay 12HT0 for the relay 12HT0 and it releases the relay 12DIS1. As described above, the operating path for relay 12DIS1 was through a normal contact of relay 12MPD. When relay 12MPD operates, it also operates relay 12HD0 over a path from ground through an operated contact of relay 12MPD, a normal contact of relay 12DIS1, and serially connected contacts of relays 12HT9–1, an operated contact of relay 12HT0 and the winding of relay 12HD0 to battery 12B10. In the event two of the relays 12HT0–9 are operated at this time to indicate two disconnect requests, the higher numbered one is preferred.

When the relay 12MPD operates, it also readies the outpulsing control circuit 900 for an outpulsing sequence to the concentrator 200. In the circuit 900, relay 12MPD inhibits the gates 9TSK2 and 9MPD1 and enables the gates 9MCK1, 11MPD and 11VF1. The control terminal C1 of the gate 9TSK2 and the control terminal C of thte gate 9MPD1, which are connected through resistor 9R13 to battery 9B9, are connected by relay 12MPD to the negative battery 9B8. The control terminal C of the gate 9MCK1 is connected to ground through the varistor 9D38 and an operated contact of the relay 12MPD and the control terminals C of gates 11MPD and 11VF1 are connected respectively to the batteries 9B8 and 11B41.

When relay 12HD0 has operated, it performs the following functions:

(1) It provides a start potential from battery 12B4 through resistor 12R4 to the start lead 12ST of the selector circuit 710; and (2) It enables the gate 8HG1 in the concentrator control circuit 600 to initiate the operation of the control circuit 900.

When the selector circuit 710 receives the start signal from the circuit 1200, it determines the identity of the trunk to be disconnected utilizing information supplied from the memory circuit 700.

During the trunk identification sequence of the selector circuit 710, the circuit 600 is operated to initiate the outpulsing sequence. The gate 8HG1 is enabled as its control terminal C is connected through a normal contact of relay 12CT1 and an operated contact of relay 12HD0 to ground. The gate 8HG1 enables the set path for the circuit 8HGS which is set by the next pulse through the lead 5TP0 from the generator 500. When the circuit 8HGS is set, it inhibits the gates 8HGS1–3 to block the scanning pulses, it enables the gates 8HGS4–9 in preparation for outpulsing to the concentrator 200, it operates the relay 9CKR and it operates the circuit 9STA in the control circuit 900 to start the outpulsing sequence. The sequence continues thereafter in a manner similar to that described above for the originating call. The circuit 9STA provides a reset pulse to the concentrator 200 and it sets the read-in flip-flop circuit 9RIA. The next timing pulse is provided through the read-in amplifier 9RA to the counters 11VGP and 11VFP.

The line information is read into the control circuit 900 in a similar manner as for an originating call except as follows:

(1) The last stage 11VFP4 is always set and moreover the gate 9MPD1 is inhibited, as described above, so that vertical file pulses cannot be sent to the concentrator 200;

(2) The stage 11VGD is set in the counter 11VGP by the read-in pulse through the enabled gate 11MPD so that ten vertical group pulses are outpulsed to the concentrator 200 to signal that the sequence is for disconnect; and (3) The gate 9TSK2 in the vertical group outpulsing path is inhibited until the trunk to be disconnected has been identified as evidenced by the operation of the relay 7TSAK in the trunk selector circuit 710.

The purpose of delaying the vertical group outpulsing is to start the vertical group and trunk outpulsing simultaneously so that all trunk outpulsing will be completed before the last stage of the ring counter 2VG in the concentrator 200 is operated.

When trunk 4T0 is identified by the selector circuit 710, the relay 7TSAK is operated. When relay 7TSAK operates, it enables the gate 9TSAK2 to begin outpulsing both the trunk identity and the ten vertical group pulses. The trunk outpulsing path is from the amplifier 9OP1 through lead 9OP, which is part of cable 7CB, the circuit 710, back through lead 9M, varistor 9MG, the gate 9CK2, amplifier 9MP, lead 8ML, which is part of cable 9CA, gate 8HGS7, amplifier 6M, transformer 6TR2 and the control pair 4CP2 to the line concentrator 200. Only a single pulse is provided under control of the circuit 710 to identify the trunk 4T0. The trunk counter 3TK is accordingly set at its stage 0.

After the vertical group and the trunk pulses are outpulsed to the concentrator 200, the flip-flop circuit 9VFLA is set. Vertical file pulses are not outpulsed, however, as indicated above, due to the inhibition of the gate 9MPD1. When the circuit 9VFLA sets, it enables the operating path for the circuit 9MA which sets when the next pulse is provided from the amplifier 9OP1. When the circuit 9MA is set, mark pulses are outpulsed to disconnect the crosspoints between the line 2L00 and the trunk 4T0 in the concentrator 200.

In the line concentrator 200 the trunk pulses arrive either simultaneously with or before the last vertical group pulse from the central office because ten vertical group pulses are always provided during the disconnect sequence whereas the maximum number of trunk pulses is ten. When the last or tenth vertical group pulse is received at the eleven-stage ring counter 2VG, it provides a control potential through its output terminal VGD to enable a gate 3VGD and through a varistor 3V3 to disable the gate 2TKB1. The gate 2TKB1 prevents the succeeding mark pulses from passing to the trunk counter 3TK. When the flip-flop circuit 9MA sets in the outpulsing control circuit 900, mark pulses are supplied from the circuit 900 through the control pair 4CP2, the amplifier 4MPR and the now enabled gate 3VGD to set the disconnect flip-flop circuit 3DA. When the flip-flop circuit 3DA operates, it provides a reset pulse through the amplified 3MR to insure that the flip-flop circuit 3MA is reset and it operates its associated relay 3D. The winding of the relay 3D is connected to the output terminal B of the circuit 3DA on one side and through the resistor 3R1 shunted by the capacitor 3C1 to the battery 3B5 on the other side. When the relay 3D operates, it in turn operates a relay 3D1 and the trunk register relay 3TKR0. The operating path for the relay 3D1 is from ground through an operated contact of relay 3D and the winding of relay 3D1 to the battery 3B12. The operating path of the relay 3TKR0 is from the output terminal B of the stage 3TK0 in the counter 3TK through the winding of the relay 3TKR0, the resistor 3TKL and an operated contact of relay 3D to the battery 2B1. When the relay 3D1 operates, it in turn operates a relay 3D2 over an operating path to the battery 3B11 and when the relay 3TKR0 operates, it in turn operates an associated relay 3TKA0 over an operating path to the battery 3B9. When the relays 3D1 and 3TKA0 operate, they complete operating paths for the relays 3G0 and 3F0. The operating path for the relay 3G0 is from ground through an operated contact of relay 3D1, an operated contact of relay 3TKA0, an operated contact of the crosspoint relay 3TG00 and the winding of relay 3G0 to the battery 3B8. The relay 3TG00 is operated even in the absence of a closed operating path because, as described above, it remains operated to maintain the connection to the trunk 4T0 when the operating path is released. A similar operating path is provided through the serially connected operated contacts of the relays 3D1, 3TKA0 and 3TF00 for the relay 3F0. The relays 3TG00 and 3TF00 were operated when the call was established and their contacts are now utilized to select one of the relays 3G0–9 and one of the relays 3F0–4 to identify the file and group number of the line to be disconnected. When the relays 3F0 and 3G0 operate, they lock to ground through an operated contact of the relay 3TKA0.

The operation of the relays 3F0 and 3G0 in combination with the operated relay 3TKA0 completes a path for applying release current to the crosspoint relays 3TG00 and 3TF00 and for operating the line cut-off relay 3C00 and the check relay 3CK1. The release path for the relay 3TG00 is from ground through an operated contact of relay 3D2, an operated contact of relay 3TKA0, an operated contact of relay 3G0, the winding of relay 3TG00 and an operated contact of relay 3D2 to the battery 3B7. The release path for the relay 3TF00 is from ground through the operated contact of relay 3D2, an operated contact of relay 3TKA0, an operated contact of relay 3F0, the winding of relay 3TF00 and the operated contact of relay 3D2 to battery 3B7. The operating path for the relays 3CK1 and 3C00 is from ground through the operated contact of relay 3D2, an operated contact of relay 3F0, an operated contact of relay 3G0, the winding of relay 3C00, the winding of relay 3CK1 and the operated contact of relay 3D2 to battery 3B7. When the relays 3TG00 and 3TF00 release, they open the connection from the line 2L00 to the trunk 4T0. When the relay 3CK1 operates, it completes a path for enabling the gate 3CT1. The enabling path is from the battery 3B3 through a resistor 3R3, an operated contact of relay 3D1, an operated contact of relay 3CK1, an operated contact of relay 3TKA0, an operated contact of relay 3D1 and an operated contact of relay 3TKA0 to the control terminal C of the gate 3CT1. The control terminal C is normally at a negative disabling potential due to its connection through the resistor 3T5 to the battery 3B10. When the gate 3CT1 is enabled, it readies a path for returning the next mark pulse to the central office as a disconnect check pulse. The next mark pulse is routed from the amplifier 4MPR through the gate 3CT1, the amplifier 4CTT, the transformer 4TR1, the control pair 4CP1, the transformer 6TR1, the amplifier 6CT, the enabling gate 8HGS8, lead 8CTL, which is part of cable 9CA, and the enabled gate 9M2 to set the flip-flop circuit 9CTA in the outpulsing control circuit 900. When the circuit 9CTA is set, it enables a reset path to the line concentrator 200 and it operates successively the relays 9CT and 12CT1.

When the circuit 9CTA operates, it enables the gate 9CT1 which readies a path from the lead 5TP0 to the lead 8RSL. When the next timing pulse is provided from the generator 500 through the lead 5TP0, it passes through the gate 9CT1, lead 8RSL, which is part of cable 9CA, the enabled gate 8HGS4, the amplifier 6RS, the transformer 6TR1, the control pair 4CP1, the transformer 4TR1, the amplifier 4RSR to the varistors 3V1, 3V2, 2V3 and 2V4 and to the amplifier 2RS2. The varistor 3V1 passes the reset pulse through an amplifier 3DR to the reset terminal of the circuit 3DA causing it to reset and in turn successively resets the relays 3D, 3D1 and 3D2. When the relay 3D releases, it also releases the relay 3TKR0 which in turn releases the relay 3TKA0. When the relay 3TKA0 releases, it releases the relays 3G0 and 3F0. When the relay 3D2 releases, it releases the relay 3CK1. The cut-off relay 3C00 remains latched operated to connect the line 2L00 to the line scanner 220.

The reset pulse through the varistor 3V2 is provided through the amplifier 3MR to insure that the circuit 3MA is reset. The reset pulses through the varistors 2V3 and 2V4 are provided respectively to the reset terminals R of the counters 2VF and 2VG to insure that they are reset at their stages 0. The reset pulse through the amplifier 2RS2 is provided to the reset terminal R of the flip-flop circuit 3TKB and to the common reset terminal R of the counter 3TK. The line concentrator 200 is in this manner returned to normal by the reset pulses from the control circuit 900. Reset pulses are continued from the control circuit 900 to the concentrator 200 until the flip-flop circuit 8HGS in the circuit 600 is reset. As is hereinafter described, when the relay 12CT1 is operated, it opens the enabling potential to the gate 8HG1 allowing the flip-flop circuit 8HGS to be reset.

As described above, when the circuit 9CTA is set, it successively operates the relays 9CT and 12CT1. When relay 12CT1 operates, it functions to erase the registration of the connection in the memory circuit 700 and it functions to reset the central office equipment to normal. The reset function is initiated when the relay 12CT1 is operated to remove ground from the control terminal C of the gate 8HG1 to disable to gate 8HG1 in the set path of the circuit 8HGS. The same contact of relay 12CT1 removes ground from the lead 8GRL which is connected through the cable 9CA to the outpulsing control circuit 900. In the circuit 900 the ground potential maintained a gate 9HGR inhibited. When the gate 9HGR is returned to normal a reset path is completed from the lead 5TP3 through the gates 9HGR and 9CKR1 to the release amplifier 9RLS. The release sequence is thereafter exactly the same as described above for the originating call. The release amplifier 9RLS provides reset pulses to the circuit 8HGS in the concentrator control circuit 600 which resets to resume normal scanning and to block the outpulsing paths from the central office. The amplifier 9RLS also provides reset pulses through the amplifier 9RS to all the flip-flop circuits and counters in the outpulsing control circuit 900 and to the memory circuit 700 returning them all to normal. The amplifier 9RLS also provides a release pulse to the trunk selector circuit 710 through the lead 9RLA, which is part of the cable 7CB.

As indicated above, when relay 12CT1 operates, it also erases the registration of the concentrator connection which was just disconnected from the memory circuit 700. The erasing function is described in the disclosure by Abbott-Krom-Mehring-Whitney. The relay 12MR3 operates to indicate that the information has been successfully removed from the memory circuit 700. When the relay 7MR3 releases, it opens the locking path for the relay 12DIS causing it to release. When the relay 12DIS releases, it releases the relay 12MPD providing an indication to the marker 1008 that the disconnect has been accomplished. The marker 1008 thereupon releases.

It is to be understood that the above-described arrangements are illustrative of the application of the principles of this invention. Numerous other arrangements may be devised by those skilled in the art without departing from the spirit and scope of the invention.

What is claimed is:

1. A signaling system for a line concentrator connecting a large number of subscriber lines to a small number of trunks extending from a central office comprising means effective when a connection is to be established to any one of said lines for transmitting line identifying signals to said line concentrator, means effective when a connection is to be established to any one of said lines for transmitting trunk identifying signals to said line concentrator, and means for delaying some of the line identifying signals until the trunk identifying transmission is completed.

2. A signaling system for a line concentrator connecting a large number of subscriber lines to a small number of trunks extending from a central office comprising means effective when a connection is to be established to any one of said lines for transmitting line identifying signals to said line concentrator, means effective when a connection is to be established to any one of said lines for transmitting trunk identifying signals to said line concentrator, means for delaying some of the line identifying signals until the trunk identifying transmission is completed, and means effective when a connection is to be disconnected for operating said line identifying transmitting means to transmit a disconnect indication instead of a line identification indication.

3. A signaling system for a line concentrator connecting a large number of subscriber lines to a small number of trunks extending from a central office comprising means at said central office for transmitting line identifying pulses to said line concentrator, means at said line concentrator controlled by said pulses for successively determining the service conditions of said lines, means effective when a connection is to be established to any one of said lines at said concentrator for halting the operation of said determining means, and means effective after the operation of said halting means for operating said transmitting means to transmit to said line concentrator pulses representing the identity of the line to which a connection is to be established and also the identity of one of said trunks.

4. In a line concentrator telephone system, a central office, a plurality of subscriber lines, a smaller plurality of talking trunks extending from said central office, a switching network for establishing connections between said lines and said trunks, two signaling trunks connected between said central office and said line concentrator, a signaling circuit at said central office for concurrently supplying the identity of any one of said lines and the identity of any one of said talking trunks over said signaling trunks to said line concentrator, and means controlled by said line and trunk identities for controlling said network to connect said identified line to said identified trunk.

5. In a line concentrator telephone system, a central office, a plurality of subscriber lines, a smaller plurality of talking trunks extending from said central office, a switching network for establishing connections between said lines and said trunks, two signaling trunks connected between said central office and said line concentrator, a line scanner at said network normally connected to each of said lines for supplying indications of the service conditions of said lines over said signaling trunks to said central office, a signaling circuit at said central office for concurrently supplying the identity of any one of said lines and the identity of any one of said talking trunks over said signaling trunks to said line concentrator, means controlled by said line and trunk identities for controlling said network to connect said identified line to said identified trunk, and means effective during the operation of said network for disconnecting said line scanner from said identified line whereby a clear connection is provided to said identified line.

6. A signaling system for a line concentrator connecting a large number of subscriber lines to a small number of trunks extending from a central office comprising counting means having a plurality of settings individually associated with said lines, means for normally cyclically operating said counting means to determine the service conditions of said lines, means effective during a connect operation and during a disconnect operation of said line concentrator for halting said counting means and then for resetting said counting means to a predetermined one of said settings, means effective after the operation of said halting and resetting means for transmitting to said concentrator at least one trunk identifying pulse, and means effective after the operation of said transmitting means for supplying to said counting means at least one line identifying pulse.

7. A signaling system for a line concentrator connecting a large number of subscriber lines to a small number of trunks extending from a central office comprising counting means having a plurality of settings individually associated with said lines, means for normally cyclically operating said counting means to determine the service conditions of said lines, means effective during a connect operation and during a disconnect operation of said line concentrator for halting said counting means and then for resetting said counting means to a predetermined one of said settings, means effective after the operation of said halting and resetting means for transmitting to said concentrator at least one trunk identifying pulse, means effective after the operation of said transmitting means for supplying to said counting means at least one line identifying pulse, means effective after said line identifying pulse is supplied to said concentrator for operating said transmitting means to supply a number of pulses to said concentrator, and means enabled by said line identifying pulse and operated by said number of pulses from said transmitting means for operating said concentrator.

8. In a line concentrator telephone system a plurality of subscriber lines, a scanning unit normally connected to each of said lines, counting means for supplying a series of pulses for successively readying groups of said scanning units, counting means for successively supplying scanning pulses to different groups of said scanning units wherein each includes one of said readied scanning units, each of said scanning units including means responsive upon the application of a scanning pulse thereto for providing an indication of the service condition of the associated one of said lines, and means effective when a connection is established to any one of said lines for disconnecting said connected line from the associated one of said scanning units.

9. In a line concentrator telephone system a plurality of subscriber lines, a scanning unit normally connected to each of said lines, counting means for supplying a series of pulses for successively readying groups of said scanning units, counting means for successively supplying scanning pulses to different groups of said scanning units wherein each includes one of said readied scanning units, each of said scanning units including means responsive upon the application of a scanning pulse thereto for providing an indication of the service condition of the associated one of said lines, means effective when a connection is established to any one of said lines for disconnecting said connected line from the associated one of said scanning units, and means for reconnecting said disconnected unit when the connection to the associated one of said lines is disconnected.

10. In a line concentrator telephone system, a plurality of subscriber lines arranged in groups, a plurality of trunks less in number than said plurality of lines, a switching network for establishing connections between said lines and said trunks, a scanning arrangement for each of said groups of lines, counting means having a number of positions greater by one than the number of said groups of said lines, means for normally cyclically operating said counting means through each of said positions except one to supply a number of pulses equal to the number of groups of said lines, means for successively supplying said pulses from said counting means during each cyclic operation to said scanning arrangements, and means effective when a connection is to be disconnected at said network for halting said normal cyclic operation of said counting means and for setting said counting means at said excepted position as an indication of disconnect.

11. A signaling system for a remote line concentrator comprising a plurality of subscriber lines connected to said line concentrator arranged in groups and files wherein each group consists of a plurality of said lines which are each in a different file, and each of said files consists of a plurality of units which are each in a different group, a pulse source for providing file, group and reset pulses to said line concentrator, means at said line concentrator controlled by said group, file and reset pulses for successively scanning said lines, means effective when a connection is to be established to any one of said lines for halting said scanning means and for controlling said source to provide a reset pulse and then a number of group and file pulses which identify said line, a control pulse source, and means effective during the time said group pulses are supplied under control of said halting and controlling means for operating said control pulse source to supply to said line concentrator a number of pulses which identify one of said trunks.

12. A signaling system for a remote line concentrator comprising a plurality of subscriber lines connected to said line concentrator arranged in groups and files wherein each group consists of a plurality of said lines which are each in a different file, and each of said files consists of a plurality of units which are each in a different group, a pulse source for providing file, group and reset pulses to said line concentrator, means at said line concentrator controlled by said group, file and reset pulses for successively scanning said lines, means effective when a connection is to be established to any one of said lines for halting said scanning means and for controlling said source to provide a reset pulse and then a number of group and file pulses which identify said line, a control pulse source, means effective during the time said group pulses are supplied under control of said halting and controlling means for operating said control pulse source to supply to said line concentrator a number of pulses which identify one of said trunks, and means at said line concentrator responsive to said first file pulse supplied under control of said halting and controlling means for indicating that trunk pulsing is completed and for readying said line concentrator to establish a connection between said identified line and said identified trunk.

13. A signaling system for a remote line concentrator comprising a plurality of subscriber lines connected to said line concentrator arranged in groups and files wherein each group consists of a plurality of said lines which are each in a different file, and each of said files consists of a plurality of units which are each in a different group, a pulse source for providing file, group and reset pulses to said line concentrator, means at said line concentrator controlled by said group, file and reset pulses for successively scanning said lines, means effective when a connection is to be established to any one of said lines for halting said scanning means and for controlling said source to provide a reset pulse and then a number of group and file pulses which identify said line, a control pulse source, means effective during the time said group pulses are supplied under control of said halting and controlling means for operating said control pulse source to supply to said line concentrator a number of pulses which identify one of said trunks, means at said line concentrator responsive to said first file pulse supplied under control of said halting and controlling means for indicating that trunk pulsing is completed and for readying said line concentrator to establish a connection between said identified line and said identified trunk, means effective after the operation of said indicating and readying means for operating said control source to supply a number of mark pulses to said concentrator, and means at said concentrator controlled by said mark pulses for completing the establishment of said connection.

14. A signaling system for a remote line concentrator comprising a plurality of subscriber lines connected to said line concentrator arranged in groups and files wherein each group consists of a plurality of said lines which are each in a different file, and each of said files consists of a plurality of units which are each in a different group, a pulse source for providing file, group and reset pulses to said line concentrator, means normally controlled by said group, file and reset pulses for cyclically scanning said lines, means effective when a connection is to be established at said concentrator to any one of said lines for controlling said source to provide a number of file and group pulses identifying said line to which the connection is to be established, and means effective when a connection is to be disestablished at said concentrator for controlling said source to provide a number of group pulses which is larger than the number of said groups of lines to indicate disconnect.

15. A signaling system for a remote line concentrator comprising a plurality of subscriber lines connected to said line concentrator arranged in groups and files wherein each group consists of a plurality of said lines which are each in a different file, and each of said files consists of a plurality of units which are each in a different group, a pulse source for providing file, group and reset pulses to said line concentrator, means normally connected to said lines and controlled by said group, file and reset pulses for cyclically scanning said lines, means effective when a connection is to be established at said concentrator to any one of said lines for controlling said source to provide a number of file and group pulses identifying said line to which the connection is to be established, means effective when said group and file pulses identifying said line to which a connection is to be established are received at said concentrator for establishing a connection to said line, and means effective when the connection to said line is established for disconnecting said scanning means from said connected line.

16. A signaling system for a remote line concentrator comprising a plurality of subscriber lines connected to said line concentrator arranged ing roups and files wherein each group consists of a plurality of said lines which are each in a different file, and each of said files consists of a plurality of units which are each in a different group, a pulse source for providing file, group and reset pulses to said line concentrator, a file counter at said line concentrator which is operated by said file pulses, a group counter at said counter which is operated by said group pulses, means jointly controlled by said file and said group counters for cyclically scanning said lines, a normally reset trunk counter at said line concentrator, a control pulse source, and means effective when a connection is to be established to any oneo f said lines for inhibiting the operation of said scanning means and for operating said control pulse source to supply a number of pulses identifying one of said trunks to said trunk counter.

17. A signaling system for a remote line concentrator comprising a plurality of subscriber lines connected to said line concentrator arranged in groups and files wherein each group consists of a plurality of said lines which are each in a different file, and each of said files consists of a plurality of units which are each in a different group, a pulse source for providing file, group and reset pulses to said line concentrators, a file counter at said line concentrator which is operated by said file pulses, a group counter at said counter which is operated by said group pulses, means jointly controlled by said file and said group counters for cyclically scanning said lines, a normally reset trunk counter at said line concentrator, and means effective when a service request from any one of said lines is detected by said scanning means for setting said file and said group counters to identify said service requesting line and for setting said trunk counter to identify one of said trunks.

18. A signaling system for a line concentrator connecting a large number of subscriber lines to a small number of trunks extending from a central office comprising a signaling channel connected between said line concentrator and said central office, means for supplying line identifying coded signals over said channel to said line concentrator, means at said concentrator controlled by said signals for normally scanning said lines, and means effective when any one of said lines is to be disconnected from any one of said trunks for changing the coding of said signals to indicate disconnect.

19. A signaling system for a line concentrator connecting a large number of subscriber lines to a small number of trunks extending from a central office comprising a signaling channel connected between said line concentrator and said central office, means for supplying line identifying coded signals over said channel to said line concentrator, means at said concentrator controlled by said signals for normally scanning said lines, means effective when any one of said lines is to be disconnected from any one of said trunks for supplying a unique combination of said signals to said concentrator to indicate disconnect, and means effective upon the reception of said unique combination of said signals for completing the disconnect operation.

20. In a line concentrator telephone system, a central office, a plurality of subscriber lines, a smaller plurality of talking trunks extending from said central office, a switching unit connected to said lines and to said trunks for establishing talking connections between said lines and some of said trunks, a signaling circuit at said switching unit for supplying indications of the service conditions of said lines over two of said trunks to said central office, a trunk selector at said central office and controlled by said signaling circuit for selecting an idle one of said some of said trunks, and a signaling circuit at said central office and effective after the operation of said trunk selector for supplying the identity of one of said lines and the identity of said selected trunk over said two trunks to control the operation of said switching unit.

References Cited in the file of this patent

UNITED STATES PATENTS

| | | |
|---|---|---|
| 2,724,744 | Brewer et al. | Nov. 22, 1955 |
| 2,724,746 | Bruce et al. | Nov. 22, 1955 |
| 2,806,088 | Joel | Sept. 22, 1955 |
| 2,850,576 | Krom et al. | Sept. 2, 1958 |
| 2,850,577 | Krom et al. | Sept. 2, 1958 |